(12) United States Patent
Mushano

(10) Patent No.: US 8,817,793 B2
(45) Date of Patent: *Aug. 26, 2014

(54) DATA PROCESSING APPARATUS, DATA PROCESSING SYSTEM, AND DATA PROCESSING METHOD

(75) Inventor: Mitsuru Mushano, Tokyo (JP)

(73) Assignee: Mush-A Co., Ltd., Saitama (JP)

( * ) Notice: Subject to any disclaimer, the term of this patent is extended or adjusted under 35 U.S.C. 154(b) by 158 days.

This patent is subject to a terminal disclaimer.

(21) Appl. No.: 13/486,927

(22) Filed: Jun. 1, 2012

(65) Prior Publication Data

US 2013/0028260 A1 Jan. 31, 2013

Related U.S. Application Data

(63) Continuation of application No. PCT/JP2010/070097, filed on Nov. 11, 2010.

(30) Foreign Application Priority Data

Dec. 2, 2009 (JP) ................................. 2009-274033

(51) Int. Cl.
*H04L 12/56* (2006.01)

(52) U.S. Cl.
USPC .......................................................... 370/392

(58) Field of Classification Search
CPC ...................................................... H04L 12/56
See application file for complete search history.

(56) References Cited

U.S. PATENT DOCUMENTS

| | | | | |
|---|---|---|---|---|
| 2005/0152473 A1* | 7/2005 | Maltsev et al. | ................ | 375/299 |
| 2005/0201288 A1* | 9/2005 | Shichiku et al. | .............. | 370/235 |
| 2006/0036831 A1 | 2/2006 | Karashima et al. | | |
| 2008/0248769 A1* | 10/2008 | Kondo et al. | ............... | 455/161.2 |
| 2010/0128679 A1* | 5/2010 | Kwon | ............................ | 370/329 |

FOREIGN PATENT DOCUMENTS

| | | |
|---|---|---|
| JP | 2005-198267 A | 7/2005 |
| JP | 2005-202873 A | 7/2005 |
| JP | 2005-259030 A | 9/2005 |
| JP | 2006-053662 A | 2/2006 |
| JP | 2007-193430 A | 8/2007 |
| JP | 2008-130712 A | 6/2008 |

OTHER PUBLICATIONS

Hideki Hayashi et al., A Distributed Multiple-Protocol Router for All-Optical Networks, Information Processing Society of Japan report of research (2001-DSM), vol. 2001, No. 80, p. 1-6.

(Continued)

*Primary Examiner* — Sulaiman Nooristany
(74) *Attorney, Agent, or Firm* — Osha Liang LLP

(57) ABSTRACT

A data-processing apparatus includes a plurality of processing units having frequency bands different from one another set thereto, the plurality of processing units to process packets each including data and processing information added to the data, the processing information including instruction information indicating one or more processing instructions to the data, each processing unit in the processing units including: an input/output unit to obtain, in the packets, only a packet whose address indicates the processing unit in the processing units, the address determined in accordance with the processing information; and an operation unit to execute the processing instruction in the packet obtained by the input/output unit, the input/output unit including a receiving unit to receive only an electromagnetic wave having a frequency band set to the processing unit and obtain the packet.

17 Claims, 18 Drawing Sheets

(56) References Cited

OTHER PUBLICATIONS

Takafumi Aoki et al., "Parallel Computing Architectures Using Optical Wave-Casting" Journal of Institute of Electronics, Information and Communication Engineers, vol. J79-D-I, No. 7, p. 437-445.

Doug Burger et al., "Scaling to the End of Silicon with EDGE Architectures" IEEE Computer, vol. 37, No. 7, pp. 45-55.

Japanese Office Action for Application No. 2010-199711, mailed on Jun. 28, 2011 (5 pages).

Japanese Office Action for Application No. 2010-199711, mailed on Nov. 15, 2011 (6 pages).

International Search Report issued in PCT/JP2010/006593, mailed on Feb. 22, 2011 (6 pages).

Written Opinion issued in PCT/JP2010/006593, mailed on Feb. 22, 2011 (3 pages).

International Search Report issued in PCT/JP2010/070097, mailed on Feb. 1, 2011 (7 pages).

Written Opinion issued in PCT/JP2010/070097, mailed on Feb. 1, 2011 (3 pages).

Patent Abstracts of Japan for Japanese Publication No. 2005-202873, publication date Jul. 28, 2005 (1 page).

Patent Abstracts of Japan for Japanese Publication No. 2007-193430, publication date Aug. 2, 2007 (1 page).

Patent Abstracts of Japan for Japanese Publication No. 2008-130712, publication date Jun. 5, 2008 (1 page).

Patent Abstracts of Japan for Japanese Publication No. 2005-198267, publication date Jul. 21, 2005 (1 page).

Office Action Issued in Japanese Application No. 2010-199711, Dated Apr. 17, 2012 (3 Pages with English Translation).

\* cited by examiner

Two-Input/One-Output Instruction

| Symbol | (Direction) | Hex | Instruction |
|---|---|---|---|
| + | | 10H | Add A to B / B to A (A+B / B+A) |
| − | L | 12H | Subtract R from L (L−R) |
| − | R | 13H | |
| × | | 14H | Multiply A by B / B by A (A×B / B×A) |
| / | L | 16H | Divide L by R (L/R) |
| / | R | 17H | |
| write | L | 18H | Write R to *L in Memory (*L←R) |
| write | R | 19H | |
| app1 | L | 50H | Append Data of R to Data of L (L←R) |
| app1 | R | 51H | |
| app2 | L | 52H | Append Data of R to Processing Instructions of L (L←R) |
| app2 | R | 53H | |

One-Input/One-Output Instruction

| Symbol | (Direction) | Hex | Instruction |
|---|---|---|---|
| NOP | | 00H | No Operation |
| read | | 02H | Read *A from Memory |
| | | FFH | (null) |

FIG. 7

| for LOOP EXPANDED PACKET SEQUNCES (5 X 1024 PACKETS) | | | | | | | | | | |
|---|---|---|---|---|---|---|---|---|---|---|
| DATA LENGTH | DATA BODY | MCE ID | PROCESS -ING ID | INSTRUC- TION COUNT | INSTRUCTION 1 | INSTRUCTION 2 | INSTRUCTION 3 | INSTRUCTION 4 | INSTRUCTION 5 | |
| 4 | dp | 1 | 1 | 2 | I5L:18H [writeL] | I4:10H [+] | null | null | null | |
| 4 | (ii =) 0 | 1 | 1 | 2 | I5L:18H [writeL] | I4:10H [+] | null | null | null | SAME PROCESS -ING ID |
| 4 | sp | 1 | 1 | 4 | I5R:19H [writeR] | I3L:16H [/L] | I2:02H [read] | I1:10H [+] | null | |
| 4 | (ii =) 0 | 1 | 1 | 4 | I5R:19H [writeR] | I3L:16H [/L] | I2:02H [read] | I1:10H [+] | null | |
| 4 | 2 | 1 | 1 | 2 | I5R:19H [writeR] | I3R:17H [/R] | null | null | null | |
| 4 | dp | 1 | 2 | 2 | I5L:18H [writeL] | I4:10H [+] | null | null | null | |
| 4 | (ii =) 1 | 1 | 2 | 2 | I5L:18H [writeL] | I4:10H [+] | null | null | null | SAME PROCESS -ING ID |
| 4 | sp | 1 | 2 | 4 | I5R:19H [writeR] | I3L:16H [/L] | I2:02H [read] | I1:10H [+] | null | |
| 4 | (ii =) 1 | 1 | 2 | 4 | I5R:19H [writeR] | I3L:16H [/L] | I2:02H [read] | I1:10H [+] | null | |
| 4 | 2 | 1 | 2 | 2 | I5R:19H [writeR] | I3R:17H [/R] | null | null | null | |
| ⋮ | ⋮ | ⋮ | ⋮ | ⋮ | ⋮ | ⋮ | ⋮ | ⋮ | ⋮ | |
| 4 | dp | 1 | 1024 | 2 | I5L:18H [writeL] | I4:10H [+] | null | null | null | |
| 4 | (ii =) 1023 | 1 | 1024 | 2 | I5L:18H [writeL] | I4:10H [+] | null | null | null | SAME PROCESS -ING ID |
| 4 | sp | 1 | 1024 | 4 | I5R:19H [writeR] | I3L:16H [/L] | I2:02H [read] | I1:10H [+] | null | |
| 4 | (ii =) 1023 | 1 | 1024 | 4 | I5R:19H [writeR] | I3L:16H [/L] | I2:02H [read] | I1:10H [+] | null | |
| 4 | 2 | 1 | 1024 | 2 | I5R:19H [writeR] | I3R:17H [/R] | null | null | null | |

FIG. 10

| ROOT ARRAY [256] | FLAG | COUNT VALUE | PACKET |
|---|---|---|---|
| 0 | 0 | 0 | EMPTY |
| 1 | 0 | 0 | EMPTY |
| ⋮ | ⋮ | ⋮ | ⋮ |
| n | 1 | 4 | PACKET 2 (HASH VALUE: n) |
| n+1 | 0 | 0 | PACKET 3 (HASH VALUE: n) |
| n+2 | 0 | 0 | PACKET 4 (HASH VALUE: n) |
| n+3 | 1 | 1 | PACKET 1 (HASH VALUE: n+3) |
| n+4 | 0 | 0 | PACKET 5 (HASH VALUE: n) |
| ⋮ | ⋮ | ⋮ | ⋮ |
| 255 | 0 | 0 | EMPTY |

BUFFER MEMORY 240

FIG. 17

PACKET SEQUNCES WITH PROCESSING ID = 1 (5 PACKETS)

| | DATA LENGTH | DATA BODY | MCE ID | PROCESS-ING ID | INSTRUC-TION COUNT | INSTRUCTION 1 | INSTRUCTION 2 | INSTRUCTION 3 | INSTRUCTION 4 |
|---|---|---|---|---|---|---|---|---|---|
| [P1] | 4 | dp | 1 | 1 | 2 | I5L:18H [writeL] | I4:10H [+] | | |
| [P2] | 4 | (ii =) 0 | 1 | 1 | 2 | I5L:18H [writeL] | I4:10H [+] | | |
| [P3] | 4 | sp | 1 | 1 | 4 | I5R:19H [writeR] | I3L:16H [/L] | I2:02H [read] | I1:10H [+] |
| [P4] | 4 | (ii =) 0 | 1 | 1 | 4 | I5R:19H [writeR] | I3L:16H [/L] | I2:02H [read] | I1:10H [+] |
| [P5] | 4 | 2 | 1 | 1 | 2 | I5R:19H [writeR] | I3R:17H [/R] | | |

PROCESSING OF P1 AND P2 AT PE(x1, y1) (I4), ADDRESS INFORMATION

| | | | | | | | ADDRESS INFORMATION |
|---|---|---|---|---|---|---|---|
| [P6] | 4 | dp+0 | 1 | 1 | 1 | I5L:18H [writeL] | ⟹ PE(a4) |

PROCESSING OF P3 AND P4 AT PE(x2, y2) (I1), ADDRESS INFORMATION

| | | | | | | | | | ADDRESS INFORMATION |
|---|---|---|---|---|---|---|---|---|---|
| [P7] | 4 | sp+0 | 1 | 1 | 3 | I5R:19H [writeR] | I3L:16H [/L] | I2:02H [read] | ⟹ PE(a5) |

PROCESSING OF P7 AT PE(x5, y5) (I2), ADDRESS INFORMATION

| | | | | | | | | ADDRESS INFORMATION |
|---|---|---|---|---|---|---|---|---|
| [P8] | 4 | *(sp+0) | 1 | 1 | 2 | I5R:19H [writeR] | I3L:16H [/L] | ⟹ PE(a3) |

PROCESSING OF P8 AND P5 AT PE(x3, y3) (I3), ADDRESS INFORMATION

| | | | | | | | ADDRESS INFORMATION |
|---|---|---|---|---|---|---|---|
| [P9] | 4 | *(sp+0)/2 | 1 | 1 | 1 | I5R:19H [writeR] | ⟹ PE(a4) |

PROCESSING OF P6 AND P9 AT PE(x4, y4) (I5), ADDRESS INFORMATION

| | | | | | | ADDRESS INFORMATION |
|---|---|---|---|---|---|---|
| [P10] | 4 | *(dp+0) = *(sp+0)/2 | 1 | 1 | 0 | ⟹ MCE (1) |

FIG. 18

DATA PROCESSING APPARATUS, DATA PROCESSING SYSTEM, AND DATA PROCESSING METHOD

TECHNICAL FIELD

The present invention relates to a data processing apparatus, a data processing system, and a data processing method.

BACKGROUND ART

As computer architecture, the von Neumann architecture is generally known in which instructions are sequentially fetched from a storage device (memory), decoded, and executed. This von Neumann architecture is a processing system with emphasis on instructions, in which an execution sequence of the instructions is determined in advance and processing is performed while operands (data to be calculated) are collected each time.

Further, in von Neumann computers, as CPU (Central Processing Unit) architecture that performs parallel processing of a plurality of instructions, superscalar processors are known. The superscalar processor is capable of out-of-order processing in which an instruction is issued to an execution node in the order of arrival of the operands, to be executed. However, in the superscalar processors, since a scheduler rearranges execution results in a right order while inspecting data dependency, an increase in the number of instructions that can be executed at the same time causes complication of the scheduler.

On the other hand, as non-von Neumann architecture, data-driven architecture is known, in which the data dependency is focused and processing is performed in accordance with a data flow (flow of data). This data-driven architecture is capable of processing many instructions in parallel by firing at the point of the time when the operands are ready in the execution node and by transferring the execution result of the instruction to the subsequent execution node.

For example, in Patent Document 1, a multi-processor system is disclosed in which the data-driven (data flow machine type in Patent Document 1) architecture is used for control between processors and the Neumann architecture is used for control in the processor, respectively. This multi-processor system is capable of performing parallel processing on the basis of the executable code generated by being divided into threads using the data-driven architecture and the Neumann architecture in combination without using a complicated hardware configuration.

Furthermore, for example, in Non-patent Document 1, TRIPS (Tera-op Reliable Intelligently Advanced Processing System) architecture is disclosed. This TRIPS architecture is a combination of chip architecture called tile processor and ISA (Instruction Set Architecture) called EDGE (Explicit Data Graph Execution). Among them, the tile processor is capable of keeping an operation speed high even if the number of cores is increased, by wiring only between the adjacent cores, so as to avoid a problem of wiring delay. On the other hand, the EDGE architecture aims at maximizing parallelism of processing by statically arranging the instructions in the execution node and executing them at the point of the time when the operands are ready in the execution node, similarly to the data flow architecture.

As such, a plurality of instructions can be processed in parallel by using the computer architectures as described above singly or in combination.

CITATION LIST

Patent Literature

[PTL 1]
Japanese Laid-Open Patent Publication No. 2007-193430
[PTL 2]
Japanese Laid-Open Patent Publication No. 2008-130712

Non Patent Literature

[NPL 1]
Doug Burger, et al., "Scaling to the End of Silicon with EDGE Architectures," IEEE Computer, vol. 37, no. 7, pp. 44-55, July 2004

SUMMARY OF INVENTION

Technical Problem

A parallel computer uses the above-described data-driven architecture, to be able to perform parallel processing of many instructions. Further, it uses a tile processor architecture in which execution nodes are arranged in a matrix manner, so as to be able to operate many execution nodes at a high speed.

However, in the tile processor architecture, since only adjacent execution nodes are connected, the more the total number of the execution nodes is increased, the more the number of average execution nodes to be passed therethrough when an operand moves is also increased. Therefore, although each execution node can be operated at a high speed with the tile processor architecture, the proportion of an overhead (time for movement) in the entire processing time of each operand becomes large.

The overhead can be reduced by limiting a moving range of each operand. However, this case may easily cause imbalances in operand distribution, and thus use efficiency of the execution nodes is lowered. The overhead can be reduced also by directly connecting all the execution nodes. However, this case results not only in that the problem of wiring delay cannot be avoided but also in that the more the number of execution nodes is increased, the more difficult the wiring becomes.

Thus, in order to improve a processing speed as an entire parallel computer, these elements are in a relationship of trade-off.

Solution to Problem

A main aspect of the invention for solving the foregoing issue is a data processing apparatus including a plurality of processing units having frequency bands different from one another set thereto, the plurality of processing units configured to process packets each including data and processing information added to the data, the processing information including instruction information indicating one or more processing instructions to the data, each processing unit in the plurality of processing units including: an input/output unit configured to obtain, in the packets, only a packet whose address indicates said each processing unit in the plurality of processing units, the address determined in accordance with the processing information; and an operation unit configured to execute the processing instruction in the packet obtained by the input/output unit, the input/output unit including a receiving unit configured to receive only an electromagnetic wave having a frequency band set to said each processing unit, and obtain the packet.

Other features of the present invention will become apparent from descriptions of this specification and of the accompanying drawings.

CROSS-REFERENCE TO RELATED APPLICATIONS

This application claims the benefit of priority to Japanese Patent Application Nos. 2009-274033 filed Dec. 2, 2009 of which full contents are incorporated herein by reference.

Advantageous Effects of Invention

According to the present invention, overhead of a parallel computer can be reduced and a processing speed as a whole can be improved.

BRIEF DESCRIPTION OF DRAWINGS

FIG. 7 is a diagram illustrating an example of an instruction set to be used in a data processing apparatus.

FIG. 10 is a diagram illustrating an example of expanded-loop packet sequences generated by an MCE (memory control element).

FIG. 17 is a diagram illustrating an example of a hash table to be implemented on a buffer memory.

FIG. 18 is a diagram illustrating an operation of a data processing apparatus according to an embodiment of the present invention.

DESCRIPTION OF EMBODIMENTS

At least the following details will become apparent from descriptions of this specification and of the accompanying drawings.

Outline of Configuration of Entire Data Processing System

An outline of a configuration of an entire data processing system including a data processing apparatus will be described hereinafter referring to FIG. 1.

Figure 1:
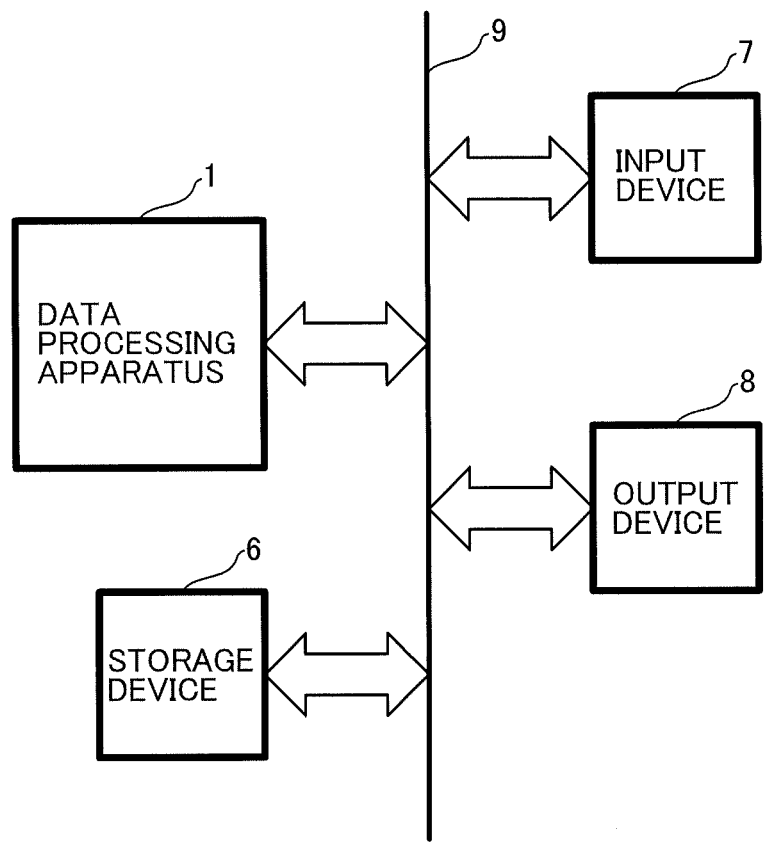
FIG. 1 is a block diagram illustrating an outline of a configuration of an entire data processing system including a data processing apparatus.

The data processing system illustrated in FIG. 1 is a parallel computer system which includes a data processing apparatus 1 and, in addition to the data processing apparatus 1, includes a storage device 6, an input device 7, an output device 8, and a bus 9. The data processing apparatus 1, the storage device 6, the input device 7 and the output device 8 are connected to on another through the bus 9. Detailed description will be given later of a configuration of the data processing apparatus 1.

===Outline of Operation of Entire Data Processing System===

Subsequently, an outline of an operation of the entire data processing system will be described.

The storage device 6 includes a RAM (Random Access Memory), a ROM (Read Only Memory) and the like, and a program (executable code), data to be used for executing the program and the like are stored therein. Also, the data processing apparatus 1 corresponds to a CPU of a computer system, and executes a program stored in the storage device 6. Detailed description of the operation of the data processing apparatus 1 will be given later.

The input device 7 includes a keyboard, a mouse and the like, and inputs information including data and programs (source program or executable code) to the data processing system from outside. On the other hand, the output device 8 includes a display, a printer and the like, and outputs the information to the outside as characters, images and the like.

The classification of the above data processing apparatus 1, the storage device 6, the input device 7, and the output device 8 is not fixed. For example, an auxiliary storage device such as hard disc drive, an optical disc drive or the like is used as the storage device 6, but may be classified as the input device 7 and the output device 8 that input/output information to/from the outside.

===Configuration of Data Processing Apparatus===

A configuration of the data processing apparatus according to an embodiment of the present invention will hereinafter be described referring to FIG. 2.

Figure 2:
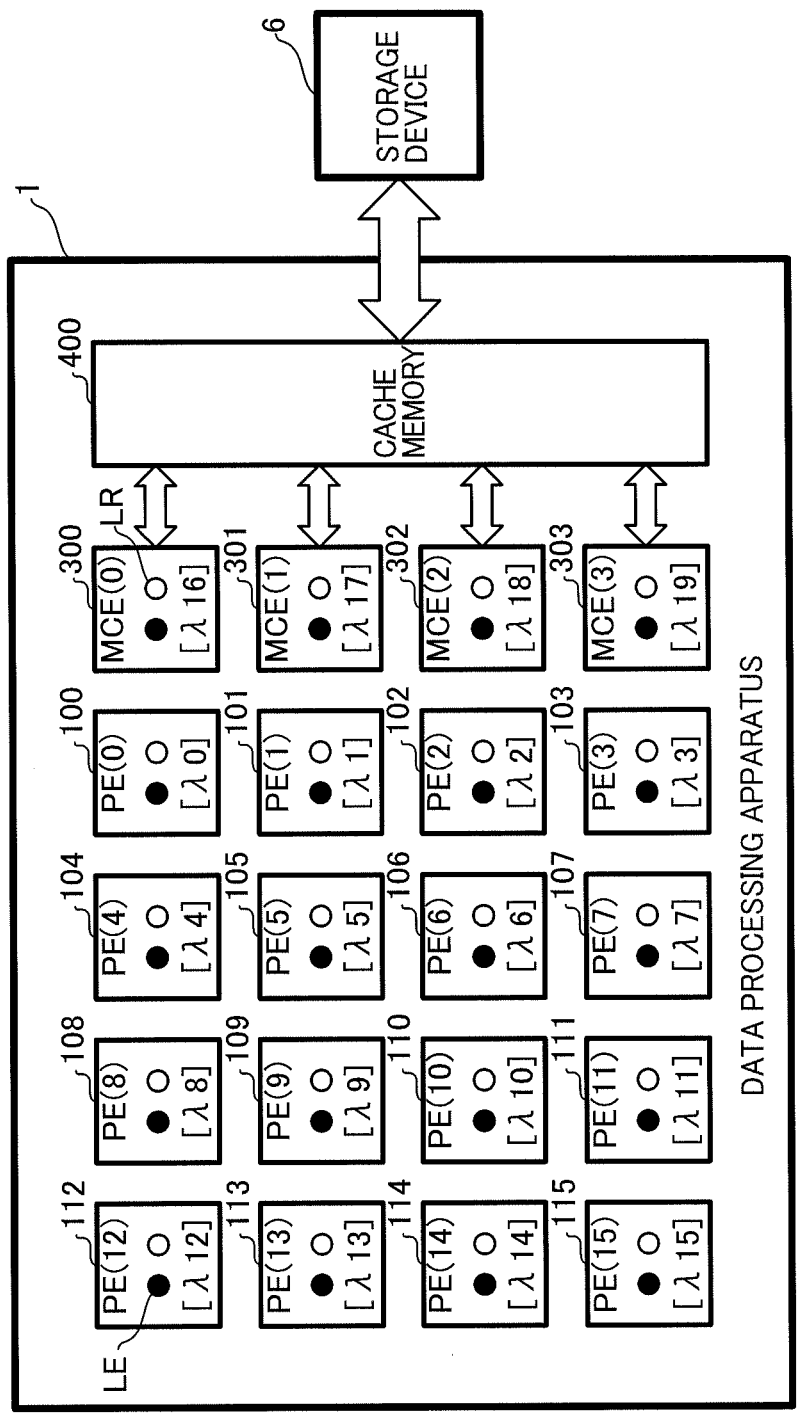
FIG. 2 is a block diagram illustrating a configuration of a data processing apparatus according to an embodiment of the present invention.

The data processing apparatus 1 illustrated in FIG. 2 includes a PE (Processor/Processing Element) 100 to 115, MCE (Memory Control/Controlling Element) 300 to 303, and a cache memory 400.

The data processing apparatus 1 includes a plurality of PEs, each corresponding to a processing unit. In an embodiment of the present invention, it is assumed as an example that the data processing apparatus 1 includes 16 PEs 100 to 115 arranged in a matrix manner with four rows and four columns, and identification numbers of 0 to 15 are set for the PEs 100 to 115, respectively, as shown in FIG. 2. Also, each PE includes a light emitting element LE and a light receiving element LR. A configuration of each PE will be described later in detail.

The data processing apparatus 1 includes at least one MCE corresponding to a control unit. In an embodiment of the present invention, as an example, the data processing apparatus 1 includes four MCEs 300 to 303, and the identification numbers 0 to 3 are set for the MCEs 300 to 303, respectively, as shown in FIG. 2. Also, each MCE includes the light emitting element LE and the light receiving element LR similarly to the PE.

The cache memory 400 is connected to the MCEs 300 to 303. Also, the cache memory 400 is connected to the storage device outside the data processing apparatus 1 through the above-described bus 9 (not shown).

===Example of Configuration and Operation of Communication Channel===

Figure 3:
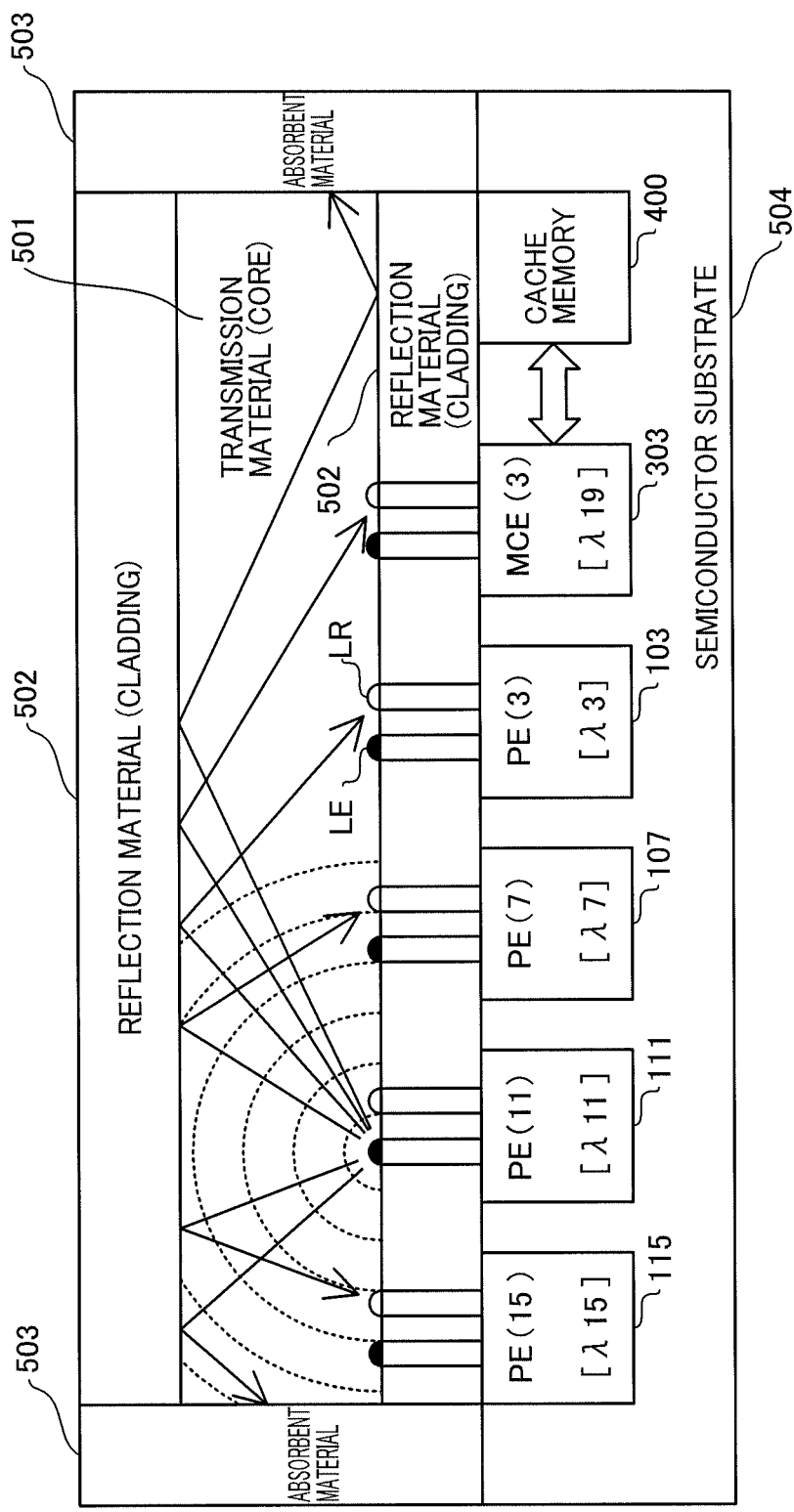
FIG. 3 is a diagram illustrating an example of a configuration of a communication channel when information is transmitted using an electromagnetic wave (light).

In an embodiment of the present invention, in order to avoid the above-described problems such as wiring delay and overhead, information transmission between the PEs and between the PE and the MCE is performed using an electromagnetic wave. Here, an example of a configuration of communication channels between the PEs and between the PE and the MCE when information is transmitted using the electromagnetic wave, particularly light, is shown in FIG. 3. FIG. 3 is a perspective view (perspective side view) of the data processing apparatus 1 if seen from the MCE 303 and the PEs 103, 107, 111, and 115 side (lower side in FIG. 2).

The communication channels shown in FIG. 3 are made of a transmission material 501 that allows light to pass therethrough, a reflection material 502 that reflects light, and an absorbent material 503 that absorbs light, and the channels are arranged on the top of a semiconductor substrate 504, on which the PEs, the MCEs, and cache memory 400 are formed. The transmission material 501 and the reflection material 502 correspond to a core and a cladding in an optical fiber, respectively, and fused silica, plastic, or the like is used. Further, using silicon or silicon nitride as the transmission material 501 and using silicon oxide as the reflection material 502, enable to form them on the semiconductor substrate 504.

In the region of the transmission material 501, the light emitting element LE and the light receiving element LR included in each PE and each MCE are arranged. Also, the transmission material 501 has a higher refractive index than that of the reflection material 502, and the reflection material 502 is arranged so as to vertically sandwich the transmission material 501. Further, the absorbent material 503 is arranged so as to surround at least the light emitting elements LE and the light receiving elements LR in order to prevent deterioration of a waveform of an optical signal caused by reflection. Thus, with such a configuration, the optical signal passes through the transmission material 501, while being fully reflected by the reflection material 502, and is incident on the light receiving elements LR.

Here, wavelength regions (frequency bands), different from one another, are set to PEs and MCEs, and each light receiving element LR is configured so as to receive only the light in the set wavelength region with an optical filter using an OCF (On-chip Color Filter), a ring oscillator or the like. In an embodiment of the present invention, byway of an example, as shown in FIG. 2, it is assumed that wavelength regions $\lambda 0$ to $\lambda 15$ are set to the PEs 100 to 115, respectively, and wavelength regions $\lambda 16$ to $\lambda 19$ are set to the MCEs 300 to 303, respectively.

Each light emitting element LE can transmit information to a selected one PE or MCE by emitting an optical signal in a wavelength region set for the PE or MCE at the information transmission destination. As a method of making the wavelength of the light variable which is emitted by the light emitting element, for example, Patent Document 2 discloses a method of controlling a wavelength by a potential applied to a control electrode of a three-terminal crystal silicon element. Also, the wavelength can be made variable by using a plurality of light emitting elements being switched which emit light in wavelength regions different from one another.

Here, referring to FIG. 4, in the communication channel shown in FIG. 3, a description will be given of a specific example of a transmission/reception operation of the data processing apparatus 1 when information is transmitted using light. Each PE and each MCE will hereinafter be referred to as PE(a) and MCE(a) associated with the set identification number a.

In the data processing apparatus 1 according to an embodiment of the present invention, information transmission between the PEs and between the PE and the MCE is performed by transmitting/receiving a packet as will be described later. Also, in the information transmission using light according to an embodiment of the present invention, if packets are transmitted from a plurality of PEs or MCEs to one PE or MCE at the same time, they are transmitted using light in the same wavelength region. Thus, the data processing apparatus 1 includes an arbitration function for arbitrating so that information is not lost or changed due to conflict.

Figure 4:
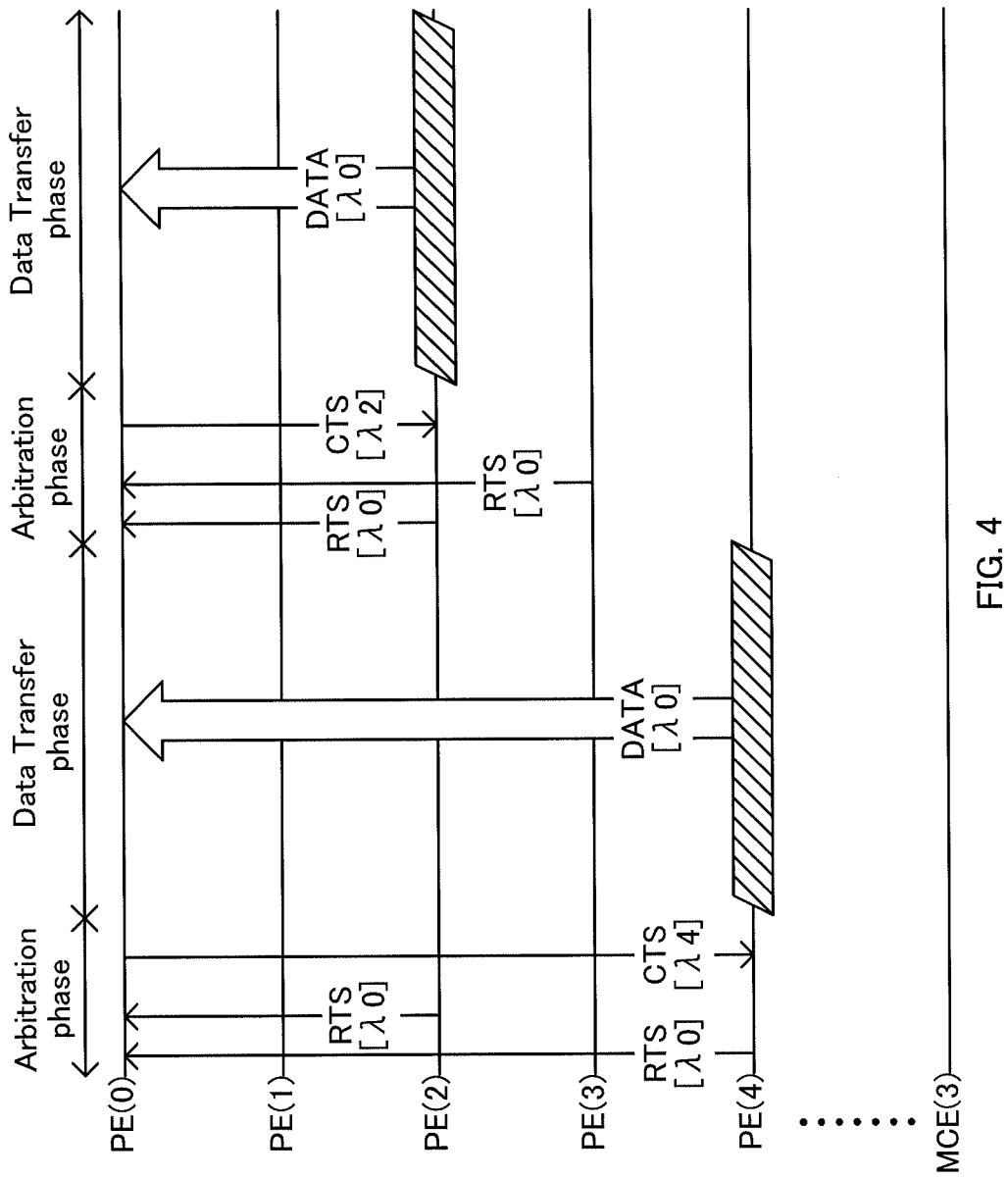
FIG. 4 is a diagram for explaining an example of an operation of transmitting/receiving a packet when information is transmitted using an electromagnetic wave (light).

In a first arbitration phase in FIG. 4, an RTS (Request to Send) packet is transmitted from the PE (2) and the PE (4) using light in a wavelength region $\lambda 0$, and the PE(0) receives the RTS packet from the PE(4) first. In this case, the PE(0) transmits a CTS (Clear to Send) packet to the PE(4) using light in a wavelength region $\lambda 4$. Then, the PE(4) receives the CTS packet, and then transmits a usual (data) packet using light in the wavelength region $\lambda 0$ to the PE(0) in a data transfer phase.

Moreover, in the subsequent arbitration phase, the RTS packet is transmitted from the PE(2) and the PE(3) using light in a wavelength region $\lambda 0$, and the PE(0) receives the RTS packet from the PE(2) first. In this case, the PE(0) transmits a CTS packet to the PE (2) using light in a wavelength region $\lambda 2$. Then, the PE(2) receives the CTS packet, and thereafter transmits a usual (data) packet to the PE(0) using light in the wavelength region $\lambda 0$ in the data transfer phase.

As described above, each light emitting element LE transmits the packet using light in the wavelength region set to the PE or MCE at the information transmission destination, and each light receiving element LR receives only the light of the set wavelength region, so that the packet can be obtained. The usual (data) packet other than the RTS/CTS packet will hereinafter be referred to simply as a packet.

The wavelength region set to each PE and each MCE may be any one from the ultraviolet region to the infrared region. However, the wavelength in a range from the visible region to the infrared region is preferably used since the ultraviolet rays are absorbed and transmittance is deteriorated depending on the material used for the transmission material 501 and the reflection material 502.

Figure 5:
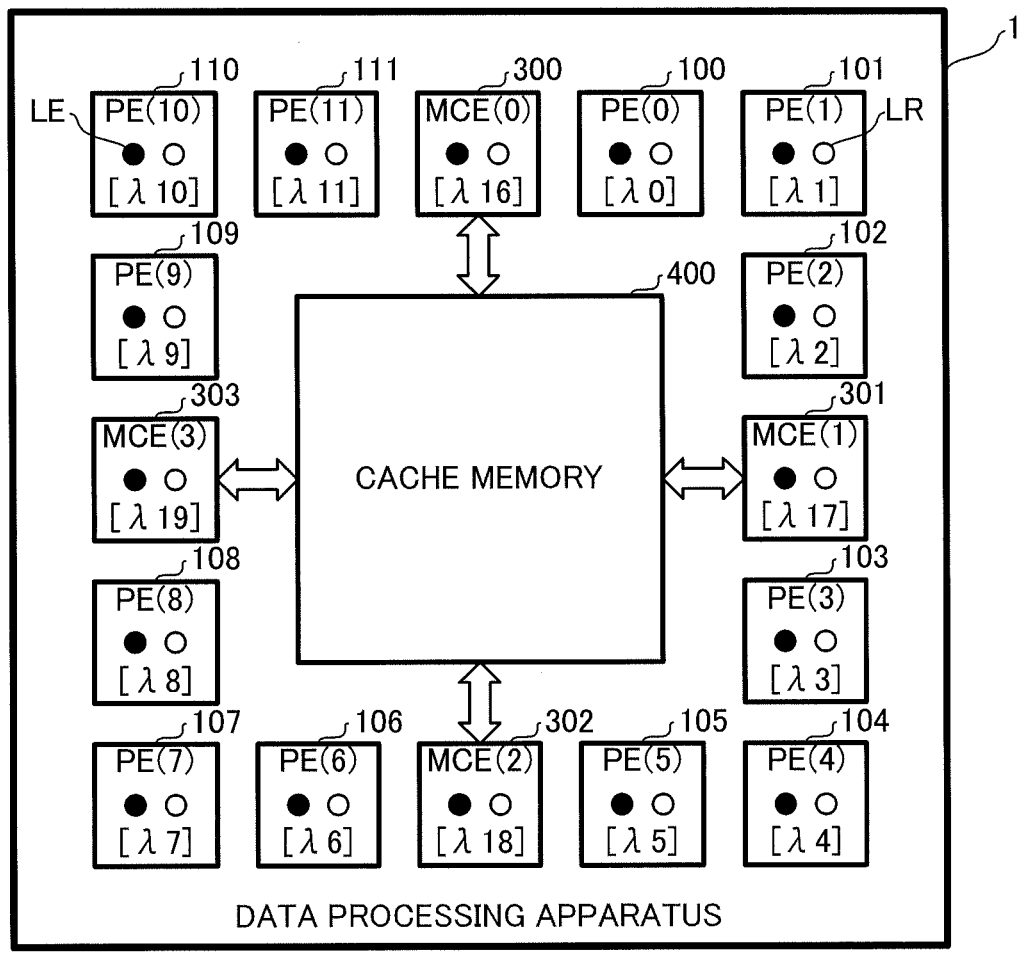
FIG. 5 is a diagram illustrating another arrangement example of a PE (processing element), an MCE (memory control element), and cache memory.

Also, arrangement of PEs in the data processing apparatus 1 is not limited to that in the matrix state similar to that in the case of the tile processor. For example, as shown in FIG. 5, the cache memory 400 with a large area may be arranged at the center, while the PEs and the MCEs may be arranged therearound. In this case, as will be described later, since the packet is issued from each MCE, a distance from the MCE at the issue source to the PE at the issue destination can be averaged.

===Operation of Data Processing Apparatus===

Subsequently, an operation of the data processing apparatus according to an embodiment of the present invention will be described by referring to FIGS. 6 to 11 as appropriate.

The cache memory 400 controls input/output between the MCEs 300 to 303 and the storage device 6 while caching. Therefore, the programs and data stored in the storage device 6 are read by the MCEs 300 to 303 through the cache memory 400.

Figure 6:
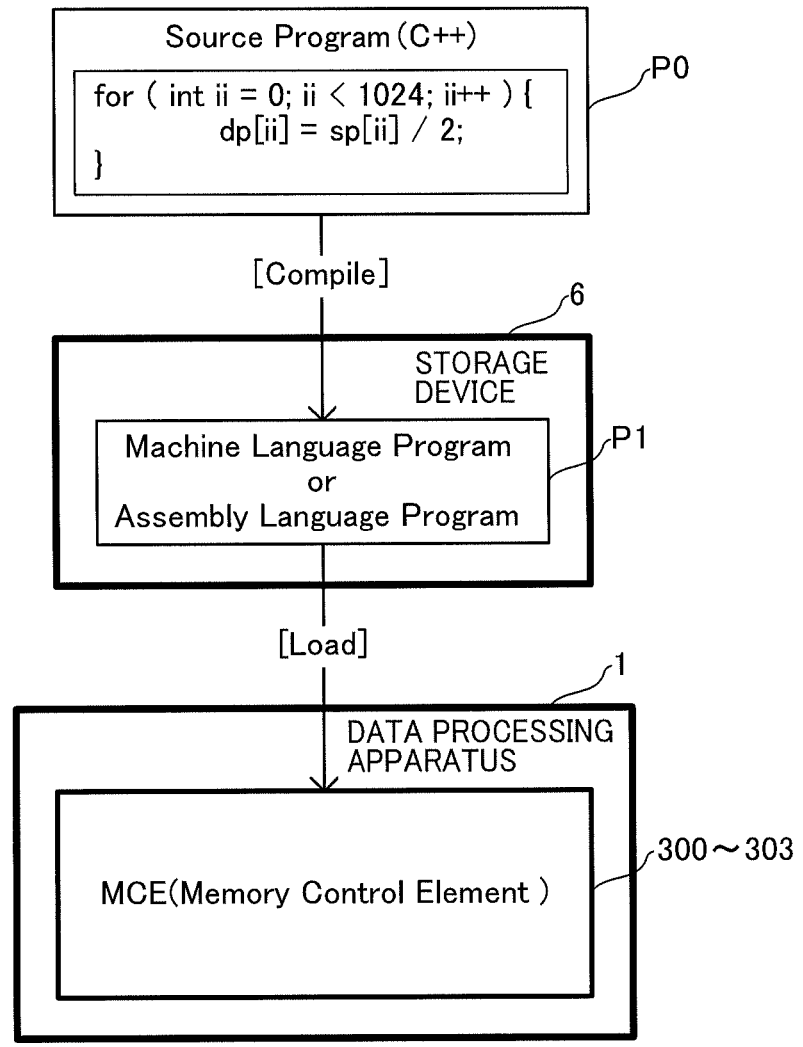
FIG. 6 is a diagram illustrating an example of a relationship between a source program and a program (executable code) to be processed by a data processing apparatus.

Here, an example of the relationship between the source program and the program processed by the data processing apparatus 1 (executable code) is shown in FIG. 6. A source program P0 written in a high-level language is compiled into an executable code P1 in advance and then, stored in the storage device 6, and the MCEs 300 to 303 read the executable code P1. In FIG. 6, as an example of the source program P0, illustrated is processing of storing a value, obtained by dividing by 2 each element in an array sp[1024] written in C++ language, in an array dp[1024]. Also, the executable code P1 may be a program written in an assembly language substantially in a one-to-one correspondence with a machine language, instead of a machine-language program.

The MCEs 300 to 303 generate sequences of packets, which will be described later, from the read-in executable code P1 on the basis of a data flowchart. Each MCE does not have to generate the data flowchart itself, but in an embodiment of the present invention, for convenience of explanation, it is assumed that the data flowchart is generated first, and then, the sequences of packets are generated on the basis of the data flowchart.

Here, an example of an instruction set to be used in the data processing apparatus 1 is shown in FIG. 7. In FIG. 7, instructions are roughly divided into a two-input/one-output instruction and a one-input/one-output instruction. Among them, the two-input/one-output instruction is an instruction for performing a binary operation where inputted two pieces of data are designated as left-hand operand and right-hand operand, respectively. On the other hand, the one-input/one-output instruction is an instruction for performing a unary operation where one inputted data is designated as operand. Also, as shown in FIG. 7, a symbol corresponding to an operator and a hexadecimal notation in machine language are set to each instruction, and they are used in the description of the data flowchart and the sequences of packets.

First, the two-input/one-output instruction will be described.

The symbol "+" and the hexadecimal notation 10H are set to an addition instruction for outputting an addition result (A+B or B+A) of two pieces of data (A and B). On the other hand, in the case of a subtraction instruction for outputting a subtraction result (L−R) of two pieces of data (L and R), since subtraction is a non-commutative operation where the commutative law does not hold, right-and-left information (direction information), indicating which of the left-hand operand or the right-hand operand each piece of data is to be designated as, is required. Thus, for the symbol "−" corresponding to the subtraction instruction, the right-and-left information "L" or "R" is further added, and the hexadecimal notations 12H and 13H are respectively set thereto.

The right-and-left information "L" indicates data to be designated as the left-hand operand, while the right-and-left information "R" indicates data to be designated as the right-hand operand. Also, in the instruction set, the LSB (Least Significant Bit) of each instruction is allocated exclusively to the right-and-left information. Therefore, in the following instructions (except the null character), the LSB of the instruction including the right-and-left information "L" and the instruction not including the right-and-left information is set to 0, while the LSB of the instruction including the right-and-left information "R" is set to 1.

The symbol "×" without the right-and-left information and the hexadecimal notation 14H are set to a multiplication instruction for outputting a multiplication result (A×B or B×A) of two pieces of data (A and B). On the other hand, the symbols "/L" and "/R" having the right-and-left information added thereto and the hexadecimal notations 16H and 17H are set to a division instruction for outputting a division result (L/R) of two pieces of data (L and R).

A writing instruction, to which symbols "writeL" and "writeR" having the right-and-left information added thereto and the hexadecimal notations 18H and 19H are set, is an instruction for writing data (R) in data (*L) stored in an address of the storage device 6 indicated by data (L). "*" is an indirect reference operator.

A data addition instruction, to which symbols "app1L" and "app1R" having the right-and-left information added thereto and the hexadecimal notations 50H and 51H are set, is an instruction for adding a data section of a packet (R) to a data section of a packet (L), which will be described later. Also, an instruction addition instruction, to which symbols "app2L" and "app2R" having the right-and-left information added thereto and the hexadecimal notations 52H and 53H are set, is an instruction for adding a data section of the packet (R) to a processing instruction section of the packet (L), which will be described later.

Subsequently, the one-input/one-output instruction will be described. Since in the one-input/one-output instruction only one data is designated as operand, no instruction includes the right-and-left information.

An NOP instruction, to which the symbol "NOP" and the hexadecimal notation 00H are set, is an instruction for doing nothing. Also, a reading instruction, to which the symbol "read" and the hexadecimal notation 02H are set, is an instruction for reading data (*A) stored at an address of the storage device 6 indicated by the data (A). Although it is not an instruction, the hexadecimal notation FFH, for example, is set as a null character that indicates the end of a packet.

Figure 8:
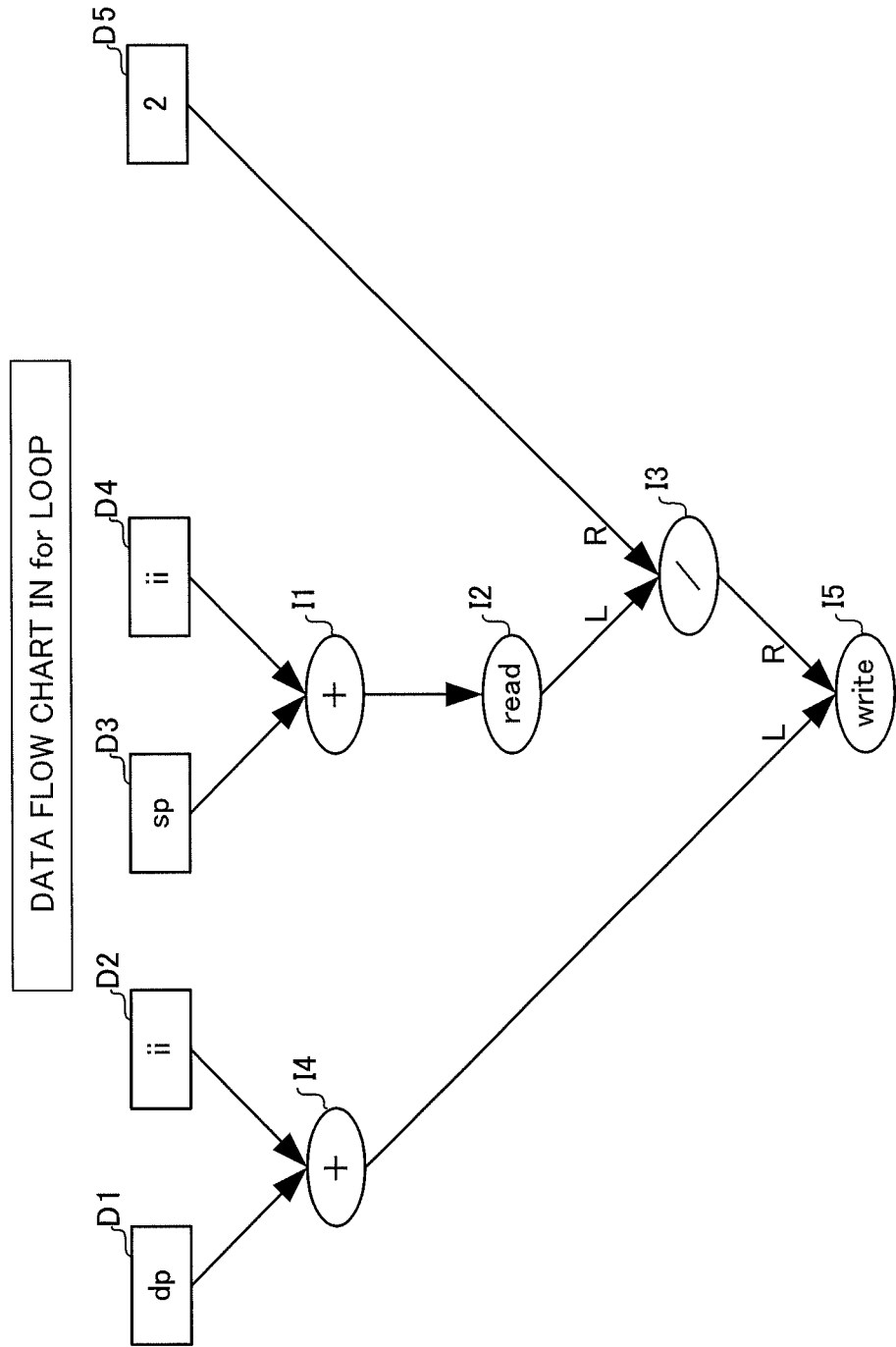
FIG. 8 is a diagram illustrating an example of a data flowchart generated by an MCE (memory control element).

Each MCE generates a data flowchart using the instruction set illustrated in FIG. 7 similarly to the case of a common data-driven architecture. FIG. 8 illustrates a data flowchart generated from the executable code P1, which corresponds to processing in a for loop of the source program P0 illustrated in FIG. 6.

In FIG. 8, D1 to D5 represent data, while I1 to I5 represent instructions. The addition instruction I4 adds the data D1(dp) and the data D2(ii) and outputs data dp+ii, while the addition instruction I1 adds the data D3(sp) and the data D4 (ii) and outputs data sp+ii. Also, the reading instruction I2 reads data*(sp+ii) from the storage device 6. Further, the division instruction I3 divides the data*(sp+ii) by the data D5 (2) and outputs data*(sp+ii)/2. The writing instruction I5 writes the data*(sp+ii)/2 in the data*(dp+ii) of the storage device 6.

Figure 9:
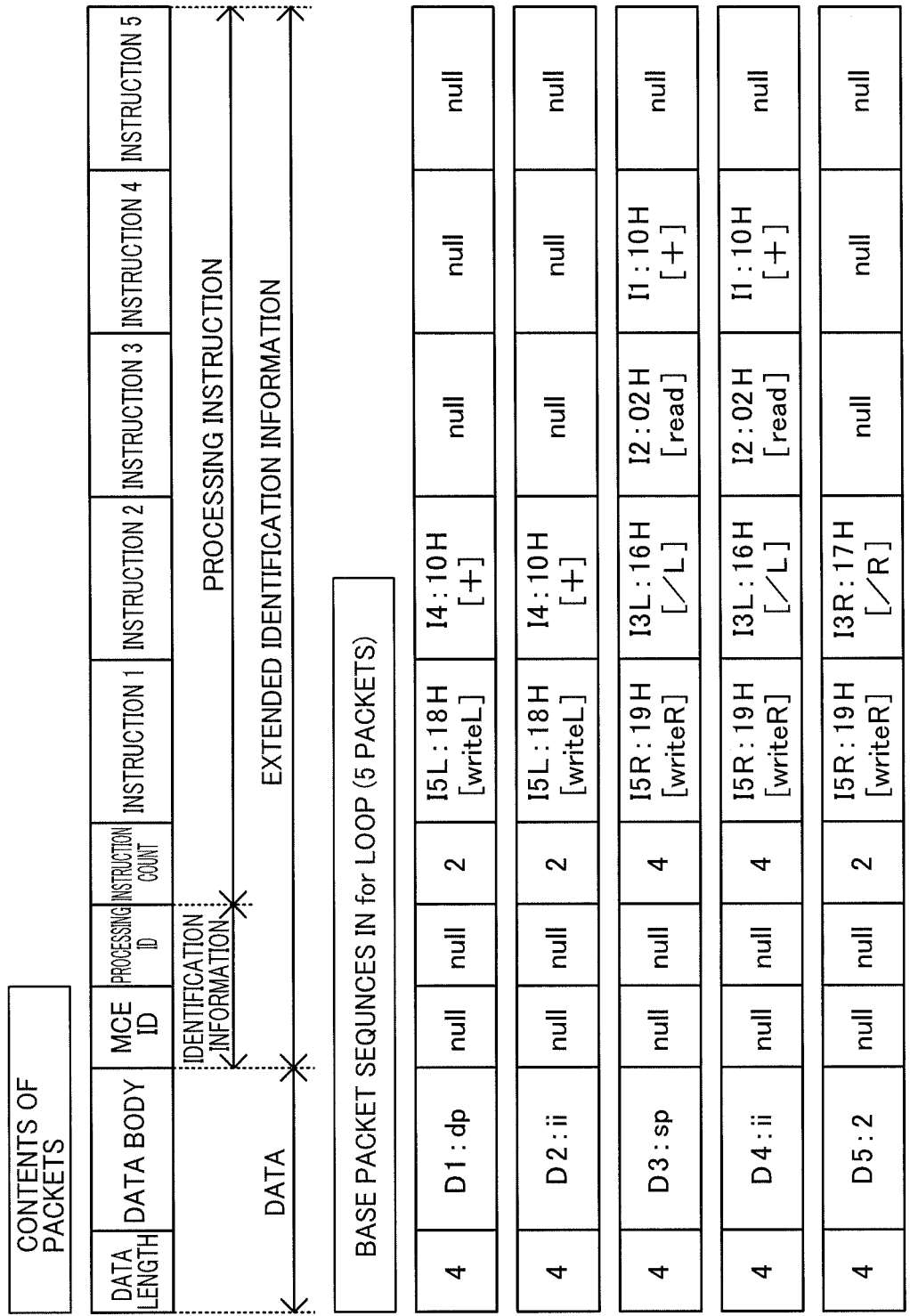
FIG. 9 is a diagram illustrating an example of base packet sequences generated by an MCE (memory control element).

Through the above dataflow, a value, which is obtained by dividing one element in the array sp[1024] by 2, is stored in the array dp[1024]. FIG. 9 illustrates base packet sequences generated on the basis of the data flowchart illustrated in FIG. 8.

Each packet includes a data section and an extended identification information section. Also, the extended identification information section includes an identification information section and a processing instruction section. Each packet may be encoded as appropriate for the purpose of encryption, compression, and the like.

The data section includes data length information of the data in addition to the data body. Also, the data length information indicates the number of bytes of the data, for example, but is not required if the data processing apparatus 1 uses only fixed-length data.

The identification information section includes an MCE ID and a processing ID, for example. In these IDs, since the processing ID is set to each base packet sequence, it is empty (null character) in FIG. 9 and is set when the for loop is unwound. On the other hand, the MCE ID corresponds to issuer information indicating the MCE that has generated the base packet sequences, and the identification numbers of 0 to 3 shown in FIG. 2 are used, for example. Also, the base packet sequences, as shown in FIG. 9, may be such that the MCE ID is rendered empty and the MCE ID is set together with the processing ID when the for loop is expanded.

In an embodiment according to the present invention, as an example, the processing instruction section includes not only up to five instructions 1 to 5 but also instruction count information. The instructions each are arranged in the order opposite to the order of the execution, in which the instruction to be executed first is arranged at the end and the subsequent instructions are empty. Moreover, the instruction count information indicates the number of unprocessed instructions but it may be counted each time.

As obvious from FIG. 9, the base packet sequences are obtained by reconfiguring the data flowchart shown in FIG. 8 by each of five data D1 to D5, and each packet is generated by adding the identification information and the processing instruction to the data. Moreover, each MCE expands a control instruction to the base packet sequences such as repetition processing, and then issues each packet to the PE at the issue destination. FIG. 10 shows the sequences of packets after the for loop has been expanded with respect to the base packet sequences shown in FIG. 9.

As shown in FIG. 6, since the for loop is repetition processing from ii=0 to ii=1023, 5×1024 packets are generated by the expansion. Also, as shown in FIG. 10, every five packets include the same processing ID in the IDs from 1 to 1024, and the five packets correspond to the base packet sequences shown in FIG. 9, respectively. FIG. 10 illustrates that the MCE ID is set to 1, as an example, so that it is indicated that the packets are generated by the MCE 301.

Each packet issued from the MCE 301 is transmitted, through the communication channel, to the PE indicated by the address information, which will be described later, in the PEs from the PE 100 to the PE 115. Also, each PE corresponds to the execution node that executes the processing instruction included in the packet. Detailed description of the operation of each PE will be described later.

As mentioned above, the data processing apparatus according to an embodiment of the present invention is greatly different from the above-described conventional computer architecture in such a point that the packet, in which the data to be designated as operand and an instruction to be designated as an operator are integrated, is to be processed.

The data processing apparatus of the present invention is not limited to the configuration including the MCE that generates the sequences of packets from the executable code P1 written in the machine language or the assembly language, as shown in an embodiment of the present invention.

For example, in the storage device 6, a program expressed by a syntax tree may be stored as an intermediate code generated in an intermediate stage during compilation from the source program P0 to the executable code P1. Since the syntax tree has a tree structure in which the operand is arranged at a leaf node and an operator is arranged at an internal node, generation of the data flowchart is easier than that in the case of the machine language or the assembly language.

Also, for example, in the storage device 6, base packet sequences or expanded-loop packet sequences generated in advance by an external device including a compiler may be stored. If the base packet sequences are stored therein, each MCE expands a control instruction to the read-in base packet sequences, sets the MCE ID and the processing ID thereto, and then issues each packet to the PE at the issue destination. On the other hand, if the expanded-loop packet sequences are stored therein, each MCE can issue each packet, as it is, to the PE at the issue destination.

Also, for example, in the storage device 6, sequences of interim packets, in which a part or the whole of the identification information section in the expanded-loop packet sequences is omitted or rendered as a null character, may be stored. In this case, each MCE sets the omitted MCE ID or processing ID and then, issues each packet to the PE at the issue destination.

Moreover, for example, expanded-loop packet sequences may be directly inputted from an external device into the data processing apparatus. The external device in this case can include other data processing apparatuses operating in parallel.

Figure 11:
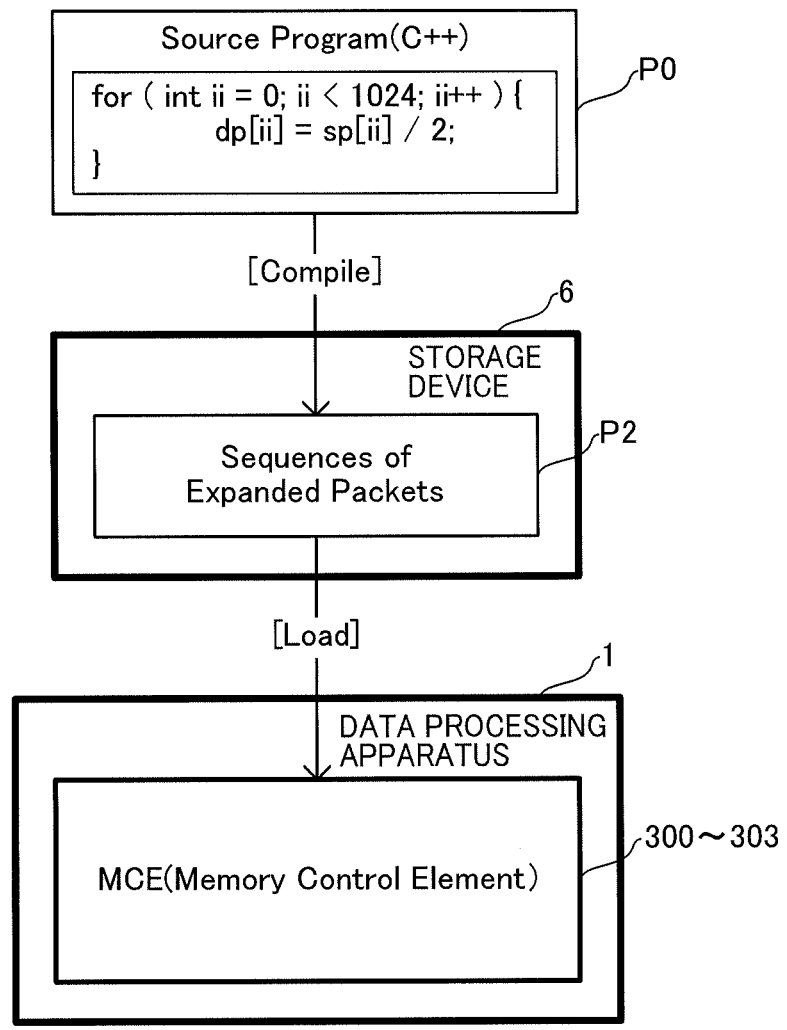
FIG. 11 is a diagram illustrating another example of a relationship between a source program and a program processed by a data processing apparatus (executable code).

Here, another example of the relationship between the source program and the program to be processed by the data processing apparatus 1 (executable code) is shown in FIG. 11. In this case, the compiler generates base packet sequences from the source program P0 written in a high-level language on the basis of the data flowchart, and further, expands the control instruction to the base packet sequences. Also, in the storage device 6, the expanded-loop packet sequences are encoded as appropriate, and then stored as an executable code P2. Then, the MCEs 300 to 303 read the executable code P2.

===Configuration of PE (Processing Element)===

The configuration of the PE according to an embodiment of the present invention will hereinafter be described referring to FIG. 12.

Figure 12:
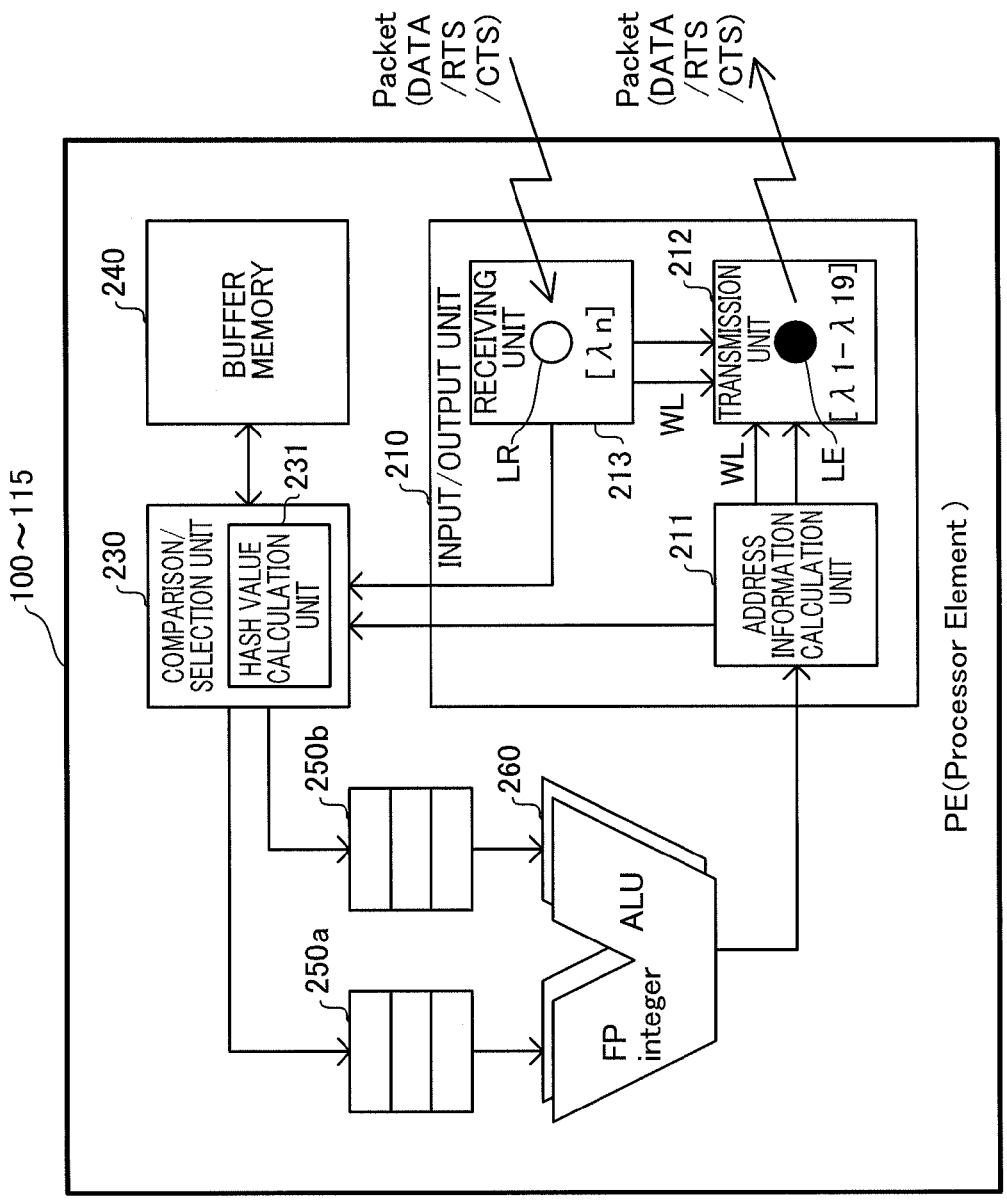
FIG. 12 is a block diagram illustrating a configuration of PE (processing element) according to an embodiment of the present invention.

The PEs 100 to 115 illustrated in FIG. 12 each include an input/output unit 210, a comparison/selection unit 230, a buffer memory 240, operand buffers 250a and 250b, and an ALU (Arithmetic Logic Unit) 260.

The input/output unit 210 includes an address information calculation unit 211, a transmission unit 212, and a receiving unit 213. The transmission unit 212 and the receiving unit 213 includes the light emitting element LE and the light receiving element LR, respectively, and transmit/receive, therethrough, the packets in the data transfer phase and the RTS/CTS packets in the arbitration phase. Moreover, the transmission unit 212 and the receiving unit 213 transmit/receive data read from the storage device 6 in response to a read instruction, and data to be written in the storage device 6 in response to a writing instruction, as packets in the data transfer phase.

As a modulation method of an optical signal when a packet is transmitted/received, OOK (On-Off Keying) can be used, for example. Also, in order to perform transmission/reception of a packet between the PE and the MCE, the MCEs 300 to 303 includes input/output units similar to the input/output unit 210.

Also, each PE and each MCE of the data processing apparatus 1 is not limited to the configuration including one light emitting element LE as shown in an embodiment of the present invention.

Figure 13:
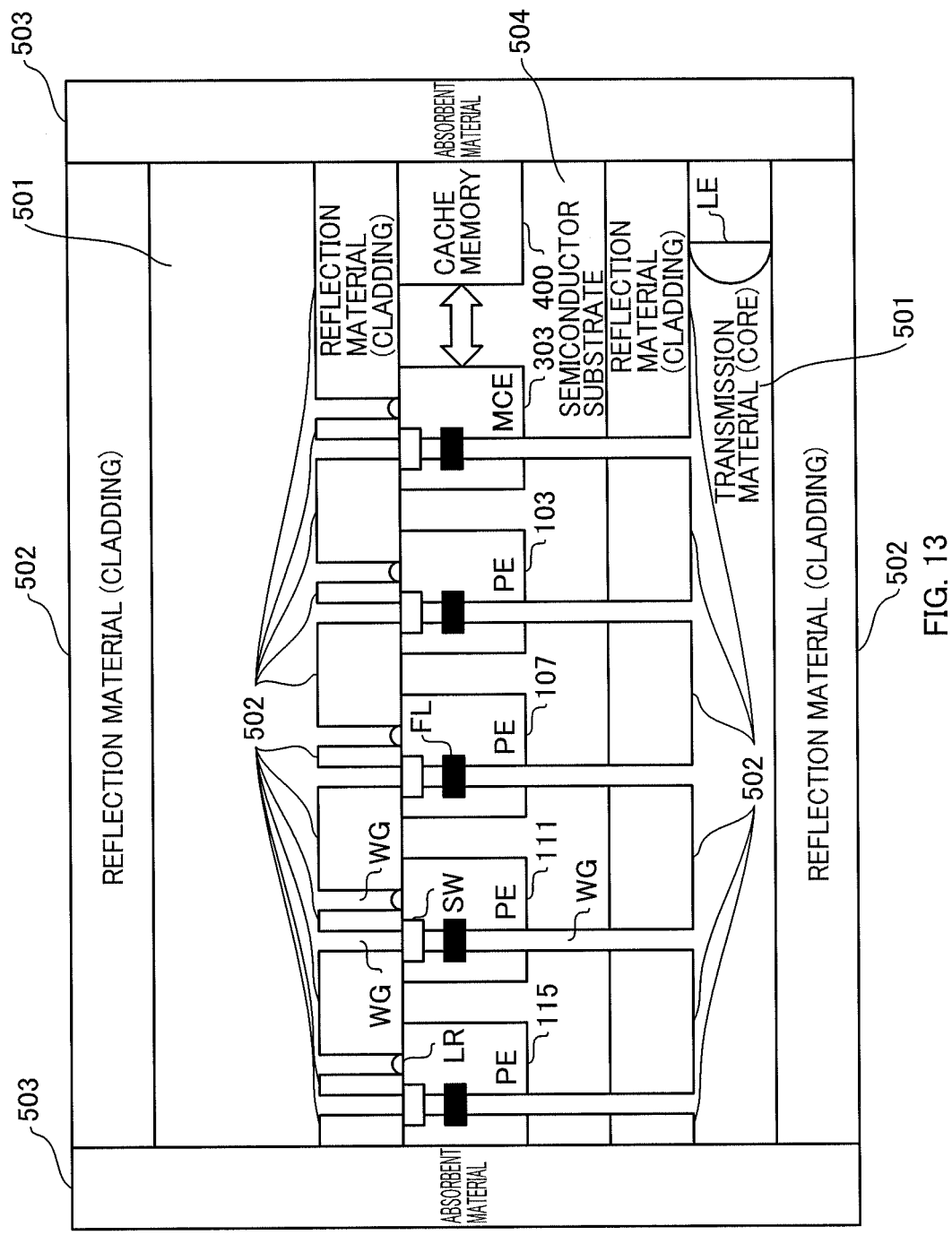
FIG. 13 is a perspective side view illustrating an example of a configuration of a data processing device including a light emitting element common to PEs (processing elements) and MCEs (memory control elements).

For example, as shown in FIG. 13, a configuration may be such that the light emitting element LE is provided common to each PE and each MCE. In FIG. 13, light in a wide wavelength region emitted from the light emitting element LE is led to each PE and each MCE through a light waveguide WG. Also, each PE and each MCE allows only the wavelength region set to the PE or the MCE at the information transmission destination to pass therethrough with an optical filter FL, and performs modulation such as OOK with an optical switch SW. Then, the modulated optical signal is led to the region of the transmission material 501 through the light waveguide GW. In FIG. 13, a configuration is such that the optical signals from other PEs or MCEs also enter the light receiving element LR through the light waveguide WG.

Figure 14:
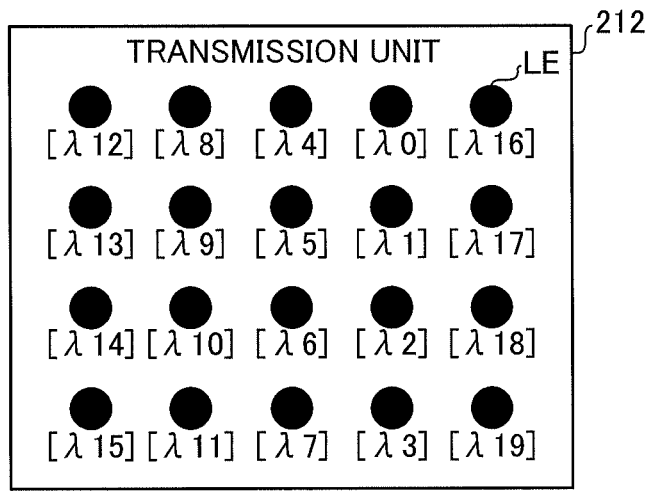
FIG. 14 is a diagram illustrating an example of a configuration of a transmission unit including a plurality of channels.

Also, a configuration may be such that each PE and each MCE includes a plurality of light emitting elements LE, and a packet is transmitted/received between the PEs or between the PE and the MCE using a plurality of channels. In this case, a plurality of light emitting elements with variable wavelengths are provided, and further, as shown in FIG. 14, for example, a configuration may be such that each transmission unit includes light emitting elements of fixed wavelengths that emit light of the set wavelength regions λ0 to λ19, and they are used being switched.

Figure 15:
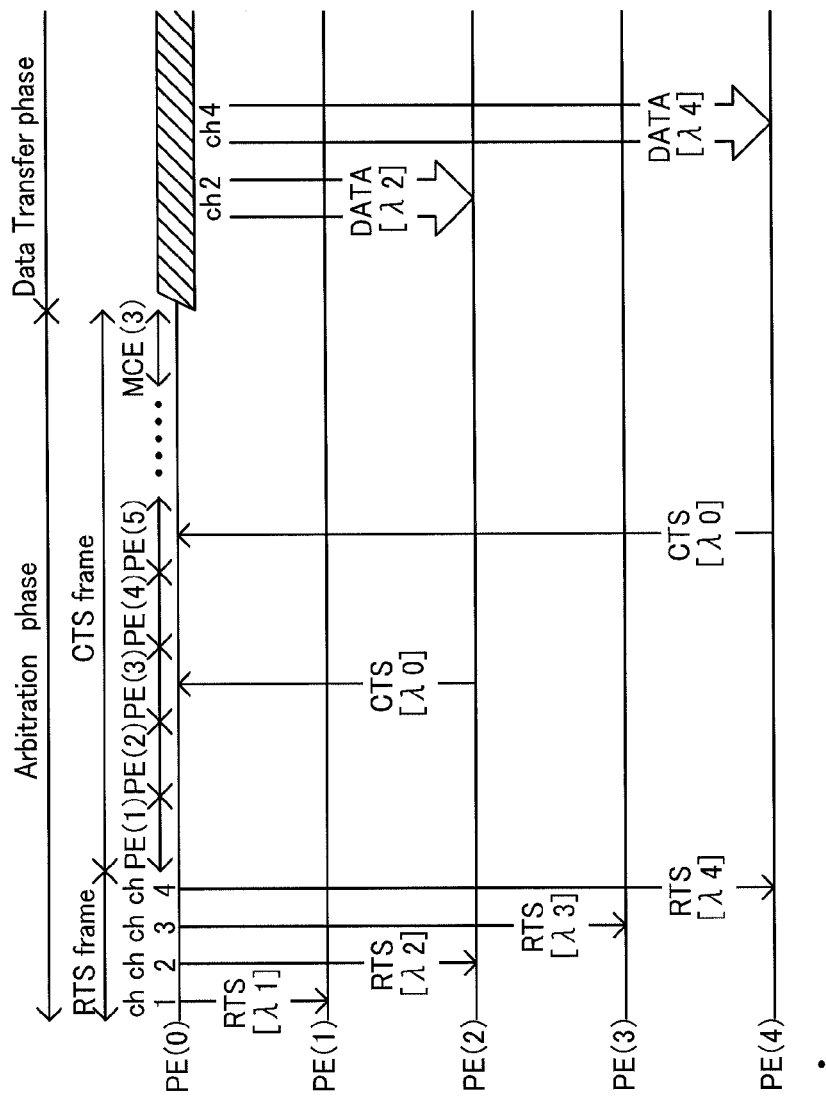
FIG. 15 is a diagram for explaining an example of an operation of transmitting/receiving a packet when each PE (processing element) and each MCE (memory control element) use a plurality of channels.

Here, referring to FIG. 15, a description will be given of a specific example of the transmission/reception operation of the data processing apparatus 1 in a case where each PE and each MCE use a plurality of channels to perform information transmission. In FIG. 15, as an example, each PE and each MCE includes at least four modulating means such as an optical switch, and use four channels at the same time. Also, the arbitration phase includes an RTS frame, in which the RTS packet is transmitted/received, and a CTS frame, in which the CTS packet is transmitted/received, and the CTS frame is further time-divided into time slots corresponding to each PE and each MCE.

In the RTS frame in FIG. 15, the RTS packets are transmitted from the PE(0) using light in the wavelength regions λ1 to λ4, and these RTS packets are received by the PE(1) to PE(4), respectively. Also, the PE(2) and the PE(4) among the PE(1) to PE(4) transmit the CTS packets to the PE(0) using light in the wavelength region λ0 in the time slots respectively corresponding thereto in the CTS frame. In this case, the PE(0) receives the CTS packets therefrom, and then transmits the packets to the PE(2) and the PE(4) using light in the wavelength regions λ2 and λ4, respectively, in the data transfer phase.

The packet obtained by the receiving unit 213 is inputted into the comparison/selection unit 230. The comparison/selection unit 230 includes a hash value calculation unit 231, and inputs/outputs a packet to/from the buffer memory 240 corresponding to a storage unit. Moreover, from the comparison/selection unit 230, packets including data to become the left-hand and right-hand operands, respectively, are inputted to the ALU 260 corresponding to an operation unit through the operand buffers 250a and 250b. And the packet newly generated by the ALU 260 is inputted to the address information calculation unit 211.

Wavelength region information WL corresponding to the address information, which will be described later, is inputted together with the newly generated packet from the address information calculation unit 211 to the transmission unit 212. Also, if the receiving unit 213 receives the RTS packet, the wavelength region information WL set to the PE or MCE at the transmission source of the RTS packet is inputted from the receiving unit 213 to the transmission unit 212. Further, if the receiving unit 213 receives the CTS packet, the CTS packet is inputted from the receiving unit 213 to the transmission unit 212. Then, the RTS/CTS packet and the packet newly generated using the light in the wavelength region indicated by the wavelength region information WL are transmitted from the transmission unit 212.

If the address information of the newly generated packet indicates the PE, the packet is inputted from the address information calculation unit 211 to the comparison/selection unit 230.

===Operation of PE (Processing Element)===

Subsequently, an operation of the PE according to an embodiment of the present invention will be described referring to FIGS. 16 and 17 as appropriate.

The receiving unit 213 of the input/output unit 210 receives only the light in the wavelength region λn set to the PE and obtains the packet. Here, each packet is transmitted using light in the wavelength region corresponding to the address information calculated by the address information calculation unit 211 of the PE or the MCE at the transmission source, and only the PE or the MCE to which the wavelength region is set can receive the packet. Therefore, each PE and each MCE can transmit the packet only to the PE which should process the packet, indicated by the address information.

The address information can be obtained from the extended identification information section of each packet. Here, a description will be given, referring to FIG. 16, of a method for calculating the address information of the first five packets with MCE ID=1 and processing ID=1 in FIG. 10 will be described. As shown in FIG. 16, the five packets are referred to as packets P1 to P5, respectively.

Figure 16:
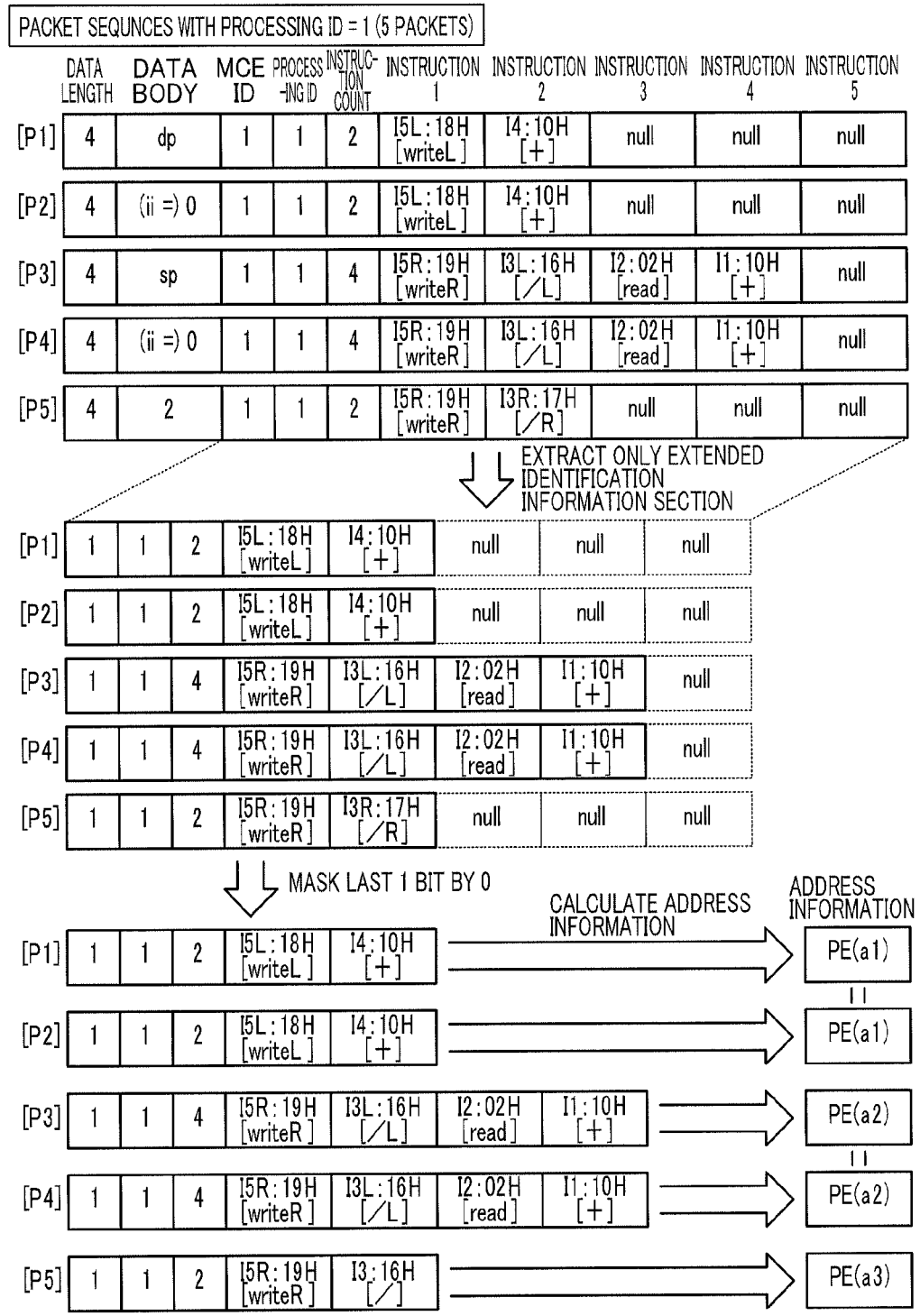
FIG. 16 is a diagram illustrating a method for calculating address information according to an embodiment of the present invention.

The address information calculation unit 211 first extracts only the extended identification information section from each packet (middle stage in FIG. 16) and masks the right-and-left information of the instruction to be executed first in each extended identification information (lower stage in FIG. 16). As described above, in an embodiment of the present invention, the instruction to be executed first is arranged at the end of the packet, and the LSB of each instruction is allocated exclusively for the right-and-left information. Therefore, it is only necessary to mask the last 1 bit of the extended identification information by 0 or 1 (0 in FIG. 16). The extended identification information may include a null character, and in this case, it is only necessary to mask 1 bit immediately before the null character and thereafter.

Then, the address information calculation unit 211 generates a pseudo random number on the basis of the above-described masked extended identification information and calculates the address information in accordance with the pseudo random number. For example, when 4-bit values of 0 to 15 are calculated as the address information, the address information can be associated with the identification numbers set to each PE shown in FIG. 2. In the lowest stages in FIG. 16, the identification numbers are represented as a1 to a3, and the address information is shown in association therewith.

Since the pseudo random number has reproducibility unlike the physical random number, the same pseudo random number is generated from the packets with the same masked extended identification information, and the same address information is calculated. For example, as shown in the lower stage of FIG. 16, from the packets P1 and P2 including the same masked extended identification information, the same address information PE(a1) is calculated. Similarly, from the packets P3 and P4, the same address information PE(a2) is calculated.

A known method can be used for the generation of the pseudo random number. From the viewpoint of calculation time for the address information, a high-speed generation method such as LOG (Linear Congruential Generator) or LFSR (Linear Feedback Shift Register) is preferably used.

Also, the address information calculation unit 211 may be so configured as to calculate the address information by referring to a pseudo random number table generated in advance. In this case, since the address information calculation unit 211 does not need to generate the pseudo random number for each packet, the calculation time for the address information can be reduced. In such a configuration, it is necessary that the address information calculation unit of each PE includes the same pseudo random number table or the common pseudo random number table is read by the address information calculation unit of each PE.

On the other hand, from the viewpoint of efficiency in the use of the PE, it is preferable that distribution of the pseudo random numbers is as uniform as possible so that the packet distribution becomes uniform. Also, if a random variable group is unpredictable, it is equal to uniform distribution, and thus, the efficiency in the use of the PE can be improved by using CSPRNG (Cryptographically Secure Pseudo-Random Number Generator). However, processing time for each packet varies with the instruction as well, and therefore even if the pseudo random numbers are distributed uniformly, the packet distribution might not become uniform.

Thus, it is preferable to use a pseudo random number with nearly uniform distribution to such an extent that the calculation time for the address information does not become too long. For example, it is not preferable that the calculation time for the address information is longer than the calculation time for a hash value, which will be described later.

As mentioned above, though, in the data processing apparatus according to an embodiment of the present invention, the PE corresponding to the execution node is arranged in a matrix manner as in the case of the tile processor, it is greatly different from the EDGE architecture in such a point that the packet to be processed is dynamically arranged on the basis of the bit string thereof itself.

The comparison/selection unit 230 inputs, to the ALU 260, the packets that can be processed in the packets obtained by the receiving unit 213 (hereinafter referred to as obtained packets). Also, the comparison/selection unit 230 stores, in the buffer memory 240, the packets that cannot be processed and reads the packets stored in the buffer memory 240 (hereinafter referred to as stored packets).

More specifically, if the instruction (at the end) to be executed first of the obtained packets is the one-input/one-output instruction, the comparison/selection unit 230 inputs only the obtained packets to the ALU 260 through the operand buffer 250*a* or 250*b*.

On the other hand, if the instruction (at the end) to be executed first of the obtained packet is the two-input/one-output instruction, the comparison/selection unit 230 searches a packet of which the above masked extended identification information coincides with that of the obtained packet from the stored packets. If there is a stored packet that coincides therewith, the comparison/selection unit 230 allows the two coinciding packets to be paired and inputs the packets to the ALU 260 through the operand buffer 250*a* and 250*b*. Also, if there is no stored packet that coincides therewith, the comparison/selection unit 230 stores the obtained packet in the buffer memory 240.

In order to efficiently search a stored packet of which masked extended identification information coincides with that of the obtained packet, in an embodiment of the present invention, the buffer memory 240 includes a hash table. Also, in the comparison/selection unit 230, the hash value calculation unit 231 calculates a hash value from the obtained packet. The hash value is calculated on the basis of the masked extended identification information of the obtained packet similarly to the case of the address information. Then, if the obtained packet is stored in the buffer memory 240, the comparison/selection unit 230 associates the obtained packet with the hash value, to be stored in the hash table.

As for the hash table, a known implementation method can be used. FIG. 11 shows an example of a hash table to be implemented in the buffer memory 240. In this hash table, as a method of resolving hash collision, an open addressing method is used and as a rehashing procedure, a linear probing method is used.

In FIG. 17, as an example, a case where after a packet 1 having the hash value of n+3 is stored, packets 2 to 5 each having the hash value of n are stored is shown. The packet 1 is stored at a location of an element n+3 of the root array [256], and a flag "1" and a count value "1" are set. Also, the packets 2 to 5 are stored at locations of the elements n, n+1, n+2, and n+4, respectively, and the flag "1" and the count value "4" are set at the location of the element n.

The ALU 260 performs an arithmetic operation (integer arithmetic and/or floating-point arithmetic) and a logical operation for the operand inputted through the operand buffers 250*a* and 250*b*, and outputs an operation result. More specifically, the ALU 260 executes an instruction (at the end) to be executed first with respect to the data of the inputted packet, generates a new packet by adding the extended identification information excluding the executed instruction to the data of the execution result, and inputs the new packet to the address information calculation unit 211.

The address information of the newly generated packet by the above-described method. Also, if the calculated address information indicates the PE, the address information calculation unit 211 inputs the newly generated packet to the comparison/selection unit 230 again, and the comparison/selection unit 230 processes the packet as an obtained packet. On the other hand, if the calculated address information does not indicate the PE, the address information calculation unit 211 inputs the wavelength region information WL corresponding to the calculated address information to the transmission unit 212 together with the newly generated packet.

When the newly generated packet is inputted, the transmission unit 212 first transmits the RTS packet using the light in the wavelength region indicated by the wavelength region information WL in the arbitration phase. Then, the transmission unit 212 transmits the newly generated packet using the light in the wavelength region indicted by the wavelength region information WL in the data transfer phase after the receiving unit 213 receives the CTS packet to the RTS packet.

If receiving the RTS packet from another PE or MCE in the arbitration phase, the receiving unit 213 inputs the wavelength region information WL indicating the wavelength region set to the PE or MCE at the transmission source of the RTS packet to the transmission unit 212. Then, the transmission unit 212 transmits the CTS packet using the light in the wavelength region indicated by the wavelength region information WL in the arbitration phase.

As described above, each PE receives only the light in the wavelength region λn set to the PE and obtains a packet, and executes an instruction (at the end) to be executed first with respect to the data of the obtained packet. Then, each PE generates a new packet by adding the extended identification information excluding the executed instruction to the data of an execution result, and transmits it using the light in the wavelength region corresponding to the address information of the generated packet.

In an embodiment of the present invention, if the address information of the generated packet indicates the PE, the packet is not transmitted from the transmission unit 212 but is processed as the obtained packet. However, a configuration may be such that the packet with the address information indicating the PE is also transmitted from the transmission unit 212 and is received by the receiving unit 213 of the PE.

Also, as described above, each packet can be encoded as appropriate, and encoding and decoding can be performed in the transmission unit 212 and the receiving unit 213, respectively, for example. That is, the packet obtained by the receiving unit 213 is decoded, and then inputted to the comparison/selection unit 230. On the other hand, the packet newly generated by the ALU 260 is encoded by the transmission unit 212 after the calculation of the address information by the address information calculation unit 211, and then is transmitted.

===Specific Example of Operation of Data Processing Apparatus===

Here, referring to FIG. 18, a description will be given of a specific example of an operation of the data processing apparatus 1 for the packets P1 to P5 shown in FIG. 16.

As described above, since the same address information PE (a1) is calculated for the packets P1 and P2, they are obtained by the PE to which the identification number a1 is set, and an addition instruction I4 at the end is executed. Then, to the data dp+0 of the execution result, the extended identification information excluding the addition instruction I4 is added, and a new packet P6 is generated. It is assumed that the address information calculated from the packet P6 is a PE (a4).

Similarly, since the same address information PE(a2) is calculated for the packets P3 and P4, they are obtained by the PE to which the identification number a2 is set, and an addition instruction I1 at the end is executed. Then, to the data sp+0 of the execution result, the extended identification information excluding the addition instruction I1 is added, and a new packet P7 is generated. It is assumed that the address information calculated from the packet P7 is a PE (a5).

The packet P7 is obtained by the PE to which an identification number a5 is set, and the read instruction I2 (1-input/1-output instruction) at the end is executed. Then, the extended identification information excluding the read instruction I2 is added to data*(sp+0) of the execution result, and a new packet P8 is generated. Since the packet P8 has the same masked extended identification information as that of the packet P5, the same address information PE(a3) as that of the packet P5 is calculated.

The packets P8 and P5 are obtained by the PE, to which the identification number a3 is set, and a division instruction I3 at the end is executed. Then, the extended identification information excluding the division instruction I3 is added to data*(sp+0)/2 of the execution result, and a new packet P9 is generated. Since the packet P9 has the same masked extended identification information as that of the packet P6, the same address information PE(a4) as that of the packet P6 is calculated.

The packets P6 and P9 are obtained by the PE to which the identification number a4 is set, and a writing instruction I5 at the end is executed. Then, the extended identification information excluding the writing instruction I5 is added to data*(dp+0)=*(sp+0)/2 of the execution result, and a new packet P10 is generated. Since the packet P10 does not include a processing instruction, the packet is subjected to exception processing, transmitted to the MCE 301 to which an identification number 1 indicated by the MCE ID is set and returned to the MCE at the issue source.

The instructions which perform input/output of data with respect to the storage device 6, such as the read instruction I2 and the writing instruction I5, may be executed by the MCE connected to the cache memory 400 instead of the PE. For example, the packet P7, in which the instruction at the end is the read instruction I2, and the packets P6 and P9, which are the writing instructions I5, may be transmitted to the MCE 301, to which the identification number 1 indicated by the MCE ID is set, similarly to the packet P10, which does not include a processing instruction. Also, the packets may be transmitted to the MCE, to which the identification number indicated by the lower 2 bits in the calculated 4-bit address information is set, for example. In this case, correspondence between the address information and the MCE can be changed as appropriate in accordance with the numbers of PEs and MCEs included in the data processing apparatus.

If, in each PE, the buffer memory or the operand buffer is full and a state is busy where the obtained packet cannot be processed, it is also preferable that the packet is returned to the MCE indicated by the MCE ID. In the exceptional processing in this case, it is only necessary that, for example, the instruction count information of the packet is set to a value greater than the maximum instruction count and the address information of such a packet is also calculated as MCE (MCE ID). Moreover, while any of the PEs is in such a busy state, each MCE preferably stops issuance of a packet of a new processing ID. In order to control the busy state, it is only necessary that a control signal line connected to all the PEs and MCEs is provided, for example, and a busy signal indicating the busy state is transmitted through the control signal line.

Also, in an embodiment of the present invention, each PE excludes executed instructions from the extended identification information section when generating a new packet. However, by indicating an instruction to be executed first by instruction count information indicating the number of unprocessed instructions, a new packet may be generated by subtracting 1 from the instruction count information instead of excluding the executed instructions from the extended identification information section. In this case, the instruction to be executed first might not be arranged at the end.

As described above, in the data processing apparatus 1, each MCE generates a packet by adding the extended identification information corresponding to processing information to each data, each PE receives only the electromagnetic wave of the frequency band set to the PE, to obtain the packet, and each packet executes an instruction of the obtained packet, to be transmitted without using an electric wire, and thus, overhead can be reduced, so that the processing speed as a whole can be improved.

Also, since a packet is transmitted using an electromagnetic wave in the frequency band set to the PE at the address determined in accordance with the extended identification information, each packet can be transmitted only to the PE that should process the packet.

Also, since the address information is calculated in accordance with the extended identification information and the packet is transmitted using the electromagnetic wave in the frequency band corresponding to the address information, the packet to be processed is dynamically arranged on the basis of the bit string thereof itself, and parallelism of the processing can be further improved.

Further, since the pseudo random numbers are generated on the basis of the extended identification information and the address information is calculated in accordance with the pseudo random numbers, the packet distribution is brought closer to uniform distribution, and efficiency in the use of the PE can be improved.

Furthermore, each PE executes an instruction to be executed first in the obtained packet, and changes an instruction, to be executed subsequently to the executed instruction in the extended identification information, into an instruction to be executed first, so that a new packet can be generated by adding the extended identification information to the data of the execution result.

Furthermore, if the address information of the generated packet indicates the PE, the packet is not transmitted but processed as an obtained packet so that overhead accompanied by the transmission/reception in this case can be reduced.

Furthermore, since arbitration is performed when each packet is transmitted, loss or change of information caused by conflict can be prevented. Particularly, by realizing the arbitration function as a collaborating function between the transmission unit and the receiving unit of each PE instead of providing an arbiter (arbitrating means) common to the entire data processing apparatus, it can be prevented that communication with the arbiter causes a bottleneck.

Furthermore, when each packet is transmitted, first, the RTS/CTS packet is transmitted, so that the arbitration function can be realized.

Furthermore, since each PE includes the light emitting element LE and the light receiving element LR, each light receiving element LR receives only the light in the wavelength region set to the PE, to obtain a packet, and the light receiving element LR transmits the packet using the light in the wavelength region set to the PE at the address, so that information transmission can be performed using the light from the ultraviolet region to the infrared region.

Furthermore, since the extended identification information includes the processing instruction and the identification information, packets, in which predetermined portions in the processing instruction and the identification information are the same, are obtained by the same PE, and the 2-input/1-output instruction for performing a binary operation can be executed in the PE.

Furthermore, since each MCE includes the input/output unit similarly to that in each PE and transmits a packet using the electromagnetic wave of the frequency band set to the PE at the address, information transmission can be performed between the PE and the MCE as well using the electromagnetic wave, so that each packet can be issued to the PE at the issue destination.

Furthermore, in the data processing system, since each MCE of the data processing apparatus 1 sequentially generates a packet or reads a sequence of packets generated in advance, an interpreter-type or a compiler-type parallel computer system can be configured.

Furthermore, as described above, each PE receives only the electromagnetic wave of the frequency band set to the PE, obtains a packet in which the extended identification information corresponding to processing information is added to each data, and executes an instruction of the obtained packet, so that each packet is transmitted without using an electric wire, and thus, overhead can be reduced, and a processing speed as a whole can be improved.

Furthermore, a packet is transmitted using the electromagnetic wave of the frequency band set to the PE at the address determined in accordance with the extended identification information, so that each PE can transmit each packet only to the PE which should process the packet.

Furthermore, each PE calculates the address information in accordance with a pseudo random number generated on the basis of the extended identification information, transmits the packet using the electromagnetic wave of the frequency band corresponding to the address information, so that the packet to be processed is dynamically arranged on the basis of the bit string thereof itself, and thus parallelism of the processing can be further improved as well as packet distribution is brought closer to uniform distribution, and use efficiency of the PE can be improved.

The above embodiments of the present invention are simply for facilitating the understanding of the present invention and are not in any way to be construed as limiting the present invention. The present invention may variously be changed or altered without departing from its spirit and encompass equivalents thereof.

REFERENCE SIGNS LIST 1 data processing apparatus
6 storage device
7 input device
8 output device
9 bus
100 to 115 PE (processing element)
210 input/output unit
211 address information calculation unit
212 transmission unit
213 receiving unit
230 comparison/selection unit
231 hash value calculation unit
240 buffer memory
250a&250b operand buffer
260 ALU (arithmetic logic unit)
300 to 303 MCE (memory control element)
400 cache memory
501 transmission material (core)
502 reflection material (cladding)
503 absorbent material
504 semiconductor substrate
LE light emitting element
LR light receiving element
FL optical filter
SW optical switch
WG light waveguide

The invention claimed is:

1. A data processing apparatus comprising:
a plurality of processing units configured to process packets, each of the packets including data and processing information added to the data, the processing information including identification information for identifying the data and instruction information indicating one or more processing instructions to the data; and
an address information calculation unit configured to calculate address information indicating a processing unit in the plurality of processing units at an address of a packet in the packets based on bit strings of both the identification information and the instruction information of the processing information, wherein
each processing unit in the plurality of processing units includes:
an input/output unit configured to obtain, in the packets, only a packet whose address information is indicative of the each processing unit; and
an operation unit configured to execute the processing instruction in the packet obtained by the input/output unit.

2. A data processing apparatus, comprising:
a plurality of processing units having frequency bands different from one another set thereto, the plurality of processing units configured to process packets, each of the packets including data and processing information added to the data, the processing information including instruction information indicating one or more processing instructions to the data, wherein each processing unit in the plurality of processing units includes:
- an input/output unit configured to obtain, in the packets, only a packet whose address is indicative of the each processing unit, the address determined in accordance with the processing information; and
- an operation unit configured to execute the processing instruction in the packet obtained by the input/output unit, wherein the input/output unit includes:
- a receiving unit configured to receive only an electromagnetic wave having a frequency band set to the each processing unit, and obtain the packet; and
- a transmission unit configured to transmit the packet using an electromagnetic wave having a frequency band set to a processing unit in the plurality of processing units at an address determined in accordance with the processing information, the input/output unit is configured to arbitrate a plurality of transmission requests to the receiving unit of said each processing unit, the transmission unit is configured to transmit, when the packet is transmitted, an RTS (Request to Send) packet using the electromagnetic wave having the frequency band set to the processing unit at an address of the packet, and start transmission of the packet after the receiving unit receives a CTS (Clear to Send) packet for the transmitted RTS packet, and the transmission unit is configured to transmit, when the receiving unit has received the RTS packet, the CTS packet using an electromagnetic wave having a frequency band set to a processing unit at a transmission source of the received RTS packet.

3. The data processing apparatus according to claim 1, wherein
the plurality of processing units are set to have frequency bands different from one another, and
the input/output unit includes a receiving unit configured to receive only an electromagnetic wave having a frequency band set to the processing unit, and obtain the packet.

4. The data processing apparatus according to claim 3, wherein
the input/output unit further includes a transmission unit configured to transmit the packet using an electromagnetic wave having a frequency band set to a processing unit in the plurality of processing units indicated by the address information.

5. The data processing apparatus according to claim 4, wherein
the input/output unit further includes the address information calculation unit, and
the transmission unit transmits the packet using the electromagnetic wave having the frequency band corresponding to the address information.

6. The data processing apparatus according to claim 5, wherein
the address information calculation unit calculates the address information in accordance with a pseudo random number generated from bit strings of both the identification information and the instruction information.

7. The data processing apparatus according to claim 5, wherein
the operation unit is configured to:
execute a processing instruction to be executed first in the processing instructions in the packet obtained by the receiving unit,
generate a packet in which the processing information is added to data generated by executing the processing instruction, the processing information including a processing instruction, to be executed subsequently to the executed processing instruction, rendered as the processing instruction to be executed first, and
input the generated packet to the address information calculation unit.

8. The data processing apparatus according to claim 4, wherein
the input/output unit is configured to arbitrate a plurality of transmission requests to the receiving unit of the processing unit.

9. The data processing apparatus according to claim 8, wherein
the transmission unit is configured to, when the packet is transmitted, transmit an RTS (Request to Send) packet using the electromagnetic wave having the frequency band set to the processing unit at an address of the packet, and start transmission of the packet after the receiving unit receives a CTS (Clear to Send) packet for the transmitted RTS packet, and
the transmission unit is configured to, when the receiving unit has received the RTS packet, transmit the CTS packet using an electromagnetic wave having a frequency band set to a processing unit at a transmission source of the received RTS packet.

10. The data processing apparatus according to claim 4, wherein
the electromagnetic wave includes ultraviolet light, visible light, infrared light, or light of a combination thereof,
the plurality of the processing units have wavelength regions different from one another set thereto,
the receiving unit receives only light in a wavelength region set to the processing unit, and obtains the packet, and
the transmission unit transmits the packet using light in a wavelength region set to the processing unit indicated by the address information.

11. The data processing apparatus according to claim 1, further comprising
a control unit configured to issue the packet to any of the plurality of processing units, and
the control unit is configured to transmit the packet using the electromagnetic wave having the frequency band set to the processing unit at an address of the packet, when the packet is issued.

12. A data processing system comprising:
the data processing apparatus according to claim 11;
a storage device having stored therein a program to be converted into the packet by the control unit, an interim packet to which at least a part of the identification information in the packet is to be added by the control unit, or the packet; and
an input/output device configured to input and/or output information, the information including the program, the interim packet or the packet, and the data.

13. A data processing method for processing packets each including data and processing information added to the data, the processing information including identification information for identifying the data and instruction information indicating one or more processing instructions to the data, the method comprising:
calculating address information indicating a processing unit in a plurality of processing units at an address of a packet in the packets on a basis of bit strings of both the identification information and the instruction information of the processing information;

causing each processing unit in the plurality of processing units to obtain, in the packets, only a packet in which the address information indicates the processing unit; and execute the processing instruction in the packet.

14. The data processing method according to claim 13, further comprising:
setting the plurality of processing units to have frequency bands different from one another; and
causing each processing unit in the plurality of processing units to receive only an electromagnetic wave having a frequency band set to the processing unit, and obtain the packet.

15. The data processing method according to claim 14, further comprising:
causing each processing unit in the plurality of processing units to transmit the packet using an electromagnetic wave having a frequency band set to a processing unit indicated by the address information.

16. The data processing method according to claim 15, further comprising:
causing each processing unit in the plurality of processing units to calculate the address information in accordance with a pseudo random number generated from bit strings of both the identification information and the instruction information, and to transmit the packet using the electromagnetic wave having the frequency band corresponding to the address information.

17. The data processing apparatus according to claim 6, wherein
the operation unit is configured to:
execute a processing instruction to be executed first in the processing instructions in the packet obtained by the receiving unit,
generate a packet in which the processing information is added to data generated by executing the processing instruction, the processing information including a processing instruction, to be executed subsequently to the executed processing instruction, rendered as the processing instruction to be executed first, and
input the generated packet to the address information calculation unit.

* * * * *